(12) United States Patent
    Zhang et al.

(10) Patent No.: US 11,622,323 B2
(45) Date of Patent: Apr. 4, 2023

(54) SLICE ALLOCATION AND INTERFACE TO APPLICATIONS

(71) Applicant: QUALCOMM Incorporated, San Diego, CA (US)

(72) Inventors: Juan Zhang, San Diego, CA (US); Ajith Tom Payyappilly, San Diego, CA (US); Tom Chin, San Diego, CA (US); Young Rak Lee, San Diego, CA (US); Xiaoyu Duan, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 93 days.

(21) Appl. No.: 17/197,417

(22) Filed: Mar. 10, 2021

(65) Prior Publication Data

US 2021/0306939 A1    Sep. 30, 2021

Related U.S. Application Data

(60) Provisional application No. 63/001,183, filed on Mar. 27, 2020.

(51) Int. Cl.
| | | |
|---|---|---|
| *H04W 48/18* | (2009.01) | |
| *H04L 12/46* | (2006.01) | |
| *H04W 40/32* | (2009.01) | |
| *H04W 76/11* | (2018.01) | |
| *H04L 101/375* | (2022.01) | |

(52) U.S. Cl.
CPC .......... *H04W 48/18* (2013.01); *H04L 12/465* (2013.01); *H04W 40/32* (2013.01); *H04W 76/11* (2018.02); *H04L 2101/375* (2022.05)

(58) Field of Classification Search
None
See application file for complete search history.

(56) References Cited

U.S. PATENT DOCUMENTS

| 10,602,422 B1 | 3/2020 | Jagannatha et al. |
| 2019/0190775 A1* | 6/2019 | Buckley .................. H04L 67/56 |
| 2020/0252285 A1* | 8/2020 | Hietalahti ............. H04W 48/18 |
| (Continued) | | |

FOREIGN PATENT DOCUMENTS

WO    2019192692 A1    10/2019

OTHER PUBLICATIONS

International Search Report and Written Opinion—PCT/US2021/021924—ISA/EPO—dated Jun. 30, 2021.

*Primary Examiner* — Christopher M Crutchfield
(74) *Attorney, Agent, or Firm* — Procopio, Cory, Hargreaves & Savitch LLP

(57) ABSTRACT

A user equipment (UE) modem stores a route selection policy (URSP), the URSP associating each of a plurality of data network name (DNN) identifiers and a corresponding slice, wherein a first DNN identifier (ID) is associated with a first DNN and a first slice and a second DNN ID is associated with the first DNN and a second slice different than the first slice. The modem establishes a first protocol data unit (PDU) session with the first DNN and the first slice in response to receiving a first indication to start a first network interface associated with the first DNN ID. The modem establishes a second PDU session with the first DNN and the second slice in response to receiving a second indication to start a second network interface associated with the second DNN ID.

22 Claims, 16 Drawing Sheets

(56) References Cited

U.S. PATENT DOCUMENTS

| | | | |
|---|---|---|---|
| 2020/0304983 A1* | 9/2020 | Zhu | H04W 36/00 |
| 2021/0084107 A1* | 3/2021 | Lu | H04M 15/8033 |
| 2021/0152615 A1* | 5/2021 | Karampatsis | H04W 40/22 |
| 2022/0201593 A1* | 6/2022 | Baek | H04W 60/00 |
| 2022/0217611 A1* | 7/2022 | Lu | H04W 24/02 |

* cited by examiner

SLICE ALLOCATION AND INTERFACE TO APPLICATIONS

CROSS REFERENCE TO RELATED APPLICATION(S)

This application claims the benefit of U.S. Provisional Application Ser. No. 63/001,183, entitled "Slice Allocation and Interface to Applications" and filed on Mar. 27, 2020, which is expressly incorporated by reference herein in its entirety.

BACKGROUND

Technical Field

The present disclosure relates generally to communication systems, and more particularly, to wireless communication at a user equipment (UE) involving multiple slices.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). The apparatus stores, at a modem, a route selection policy, the route selection policy associating each of a plurality of data network name (DNN) identifiers and a corresponding slice, wherein a first DNN identifier (ID) is associated with a first DNN and a first slice and a second DNN ID is associated with the first DNN and a second slice different than the first slice. The modem establishes a first protocol data unit (PDU) session with the first DNN and the first slice in response to receiving a first indication to start a first network interface associated with the first DNN ID. The modem establishes a second PDU session with the first DNN and the second slice in response to receiving a second indication to start a second network interface associated with the second DNN ID.

In another aspect of the disclosure, a method, a computer-readable medium, and an apparatus are provided for wireless communication at a network. For example, a network apparatus stores a mapping for at least one of: multiple DNN identifiers mapped to a single DNN, multiple slice identifiers mapped to a single slice treatment, or a combination that provides different slice treatment for a single DNN. The network apparatus establishes one or more PDU sessions with a UE using the mapping.

To the accomplishment of the foregoing and related ends, the one or more aspects comprise the features hereinafter fully described and particularly pointed out in the claims. The following description and the annexed drawings set forth in detail some illustrative features of the one or more aspects. These features are indicative, however, of but a few of the various ways in which the principles of various aspects may be employed, and this description is intended to include all such aspects and their equivalents.

DETAILED DESCRIPTION

Figure 1:
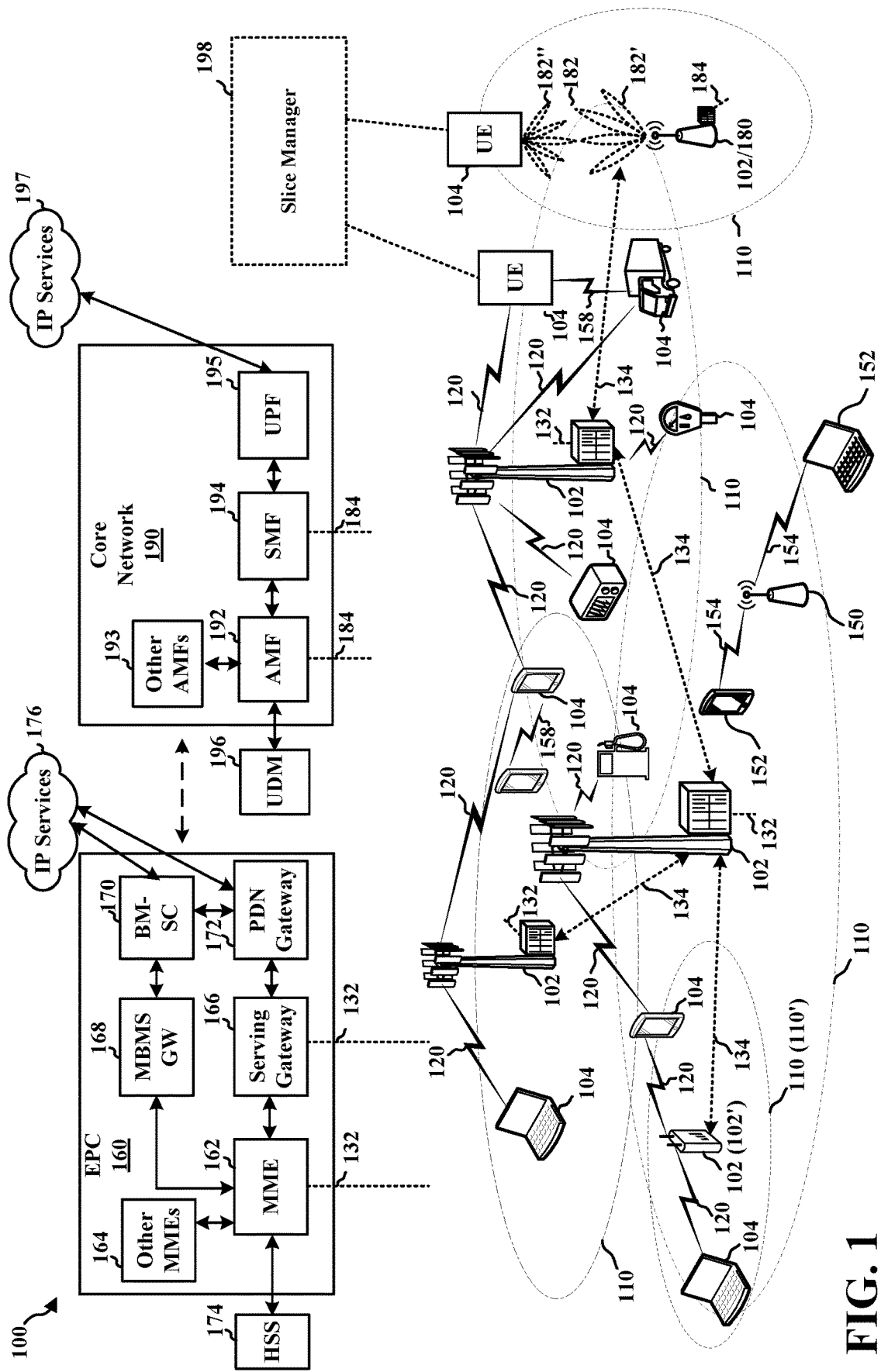
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

FIG. 1 is a diagram illustrating an example of a wireless communications system and an access network 100 in which aspects of the present disclosure may be performed, for example, enabling application-based slice allocation in a multi-slice network. The multi-slide network may comprise a multi-slice NR network in some examples. The network 100 may be a multi-slice network, where each slice defines a composition of configured network functions, network applications, and underlying cloud infrastructures that are bundled together to meet the requirement of a specific use case or business model. For example, slices may include an enhanced mobile broadband (eMBB) slice, an ultra-low latency communication (URLLC) slice, a massive Internet of things (MIoT) or massive machine-type communications (mMTC) slice, and/or a slide for any other suitable service.

As an example. NR access may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

As illustrated in FIG. 1, a UE 104 may be configured to communicate with a base station 102 or 180 over multiple slices. The UE 104 may include a slice manager 198 configured to use a pseudo DNN identifier (ID) to establish a PDU session with the DNN using a particular slice for a particular application, while enabling a modem to perform DNN level slicing. For example, a modem of the UE 104 may store a route selection policy, the route selection policy associating each of a plurality of DNN IDs and a corresponding slice, where a first DNN ID is associated with a first DNN and a first slice and a second DNN ID is associated with the first DNN and a second slice different than the first slice. The DNN may be an internet DNN. The first DNN ID may be for general applications using the first DNN, and the second DNN ID may be for one or more particular applications using the first DNN. As an example, the first DNN ID may be for an internet DN and an eMBB slice, and the second DNN ID may be for the internet DN and a different slice, such as an URLLC slice. The second DNN ID may be referred to as a "pseudo DNN ID." The slice manager 198 may be configured to establish a first PDU session with the first DNN and the first slice in response to receiving a first indication to start a first network interface associated with the first DNN ID and to establish a second PDU session with the first DNN and the second slice in response to receiving a second indication to start a second network interface associated with the second DNN ID.

Before establishing the second PDU session with the first DNN, the modem may validate the application to use the second DNN ID, e.g., using service information that may be passed from the application to the modem via the operating system and the radio interface layer (ML). Additional aspects regarding the use of the pseudo DNN ID and the service information are described herein. The aspects described herein enable the UE 104, e.g., the UE's modem, to perform DNN level network slicing, while enabling particular applications to initiate a data path pipe with a data network using a different slice than other applications exchanging communication with the same data network.

Although the following description may be focused on 5G NR, the concepts described herein may be applicable to other similar areas, such as LTE, LTE-A, CDMA, GSM, and other wireless technologies.

The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., 51 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency (RF) band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
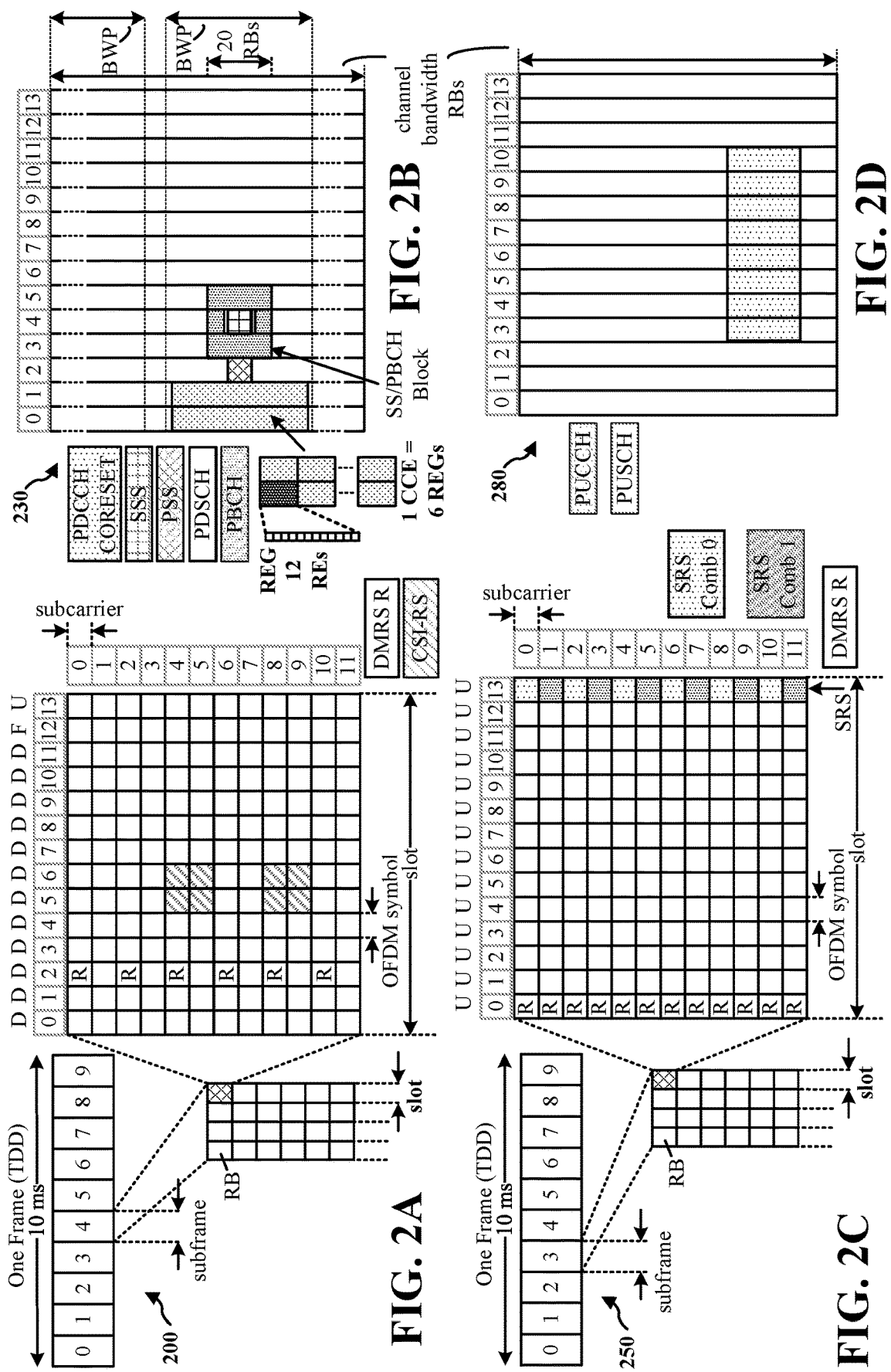
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
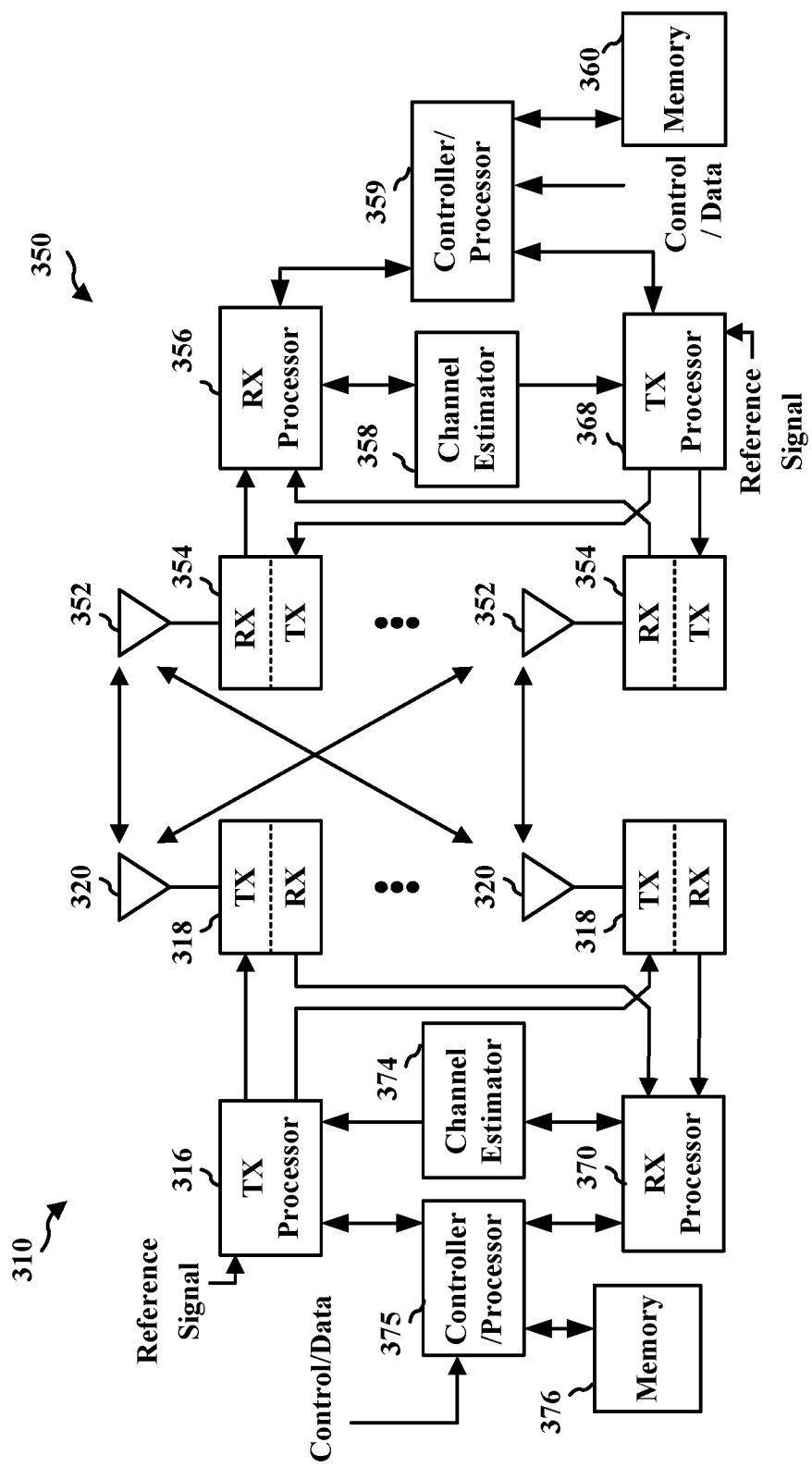
FIG. 3 is a diagram illustrating an example of a base station and UE in an access network.

FIG. 3 is a block diagram of a base station 310 in communication with a UE 350 in an access network, including components that may be used to implement aspects of the present disclosure. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

Figure 4:
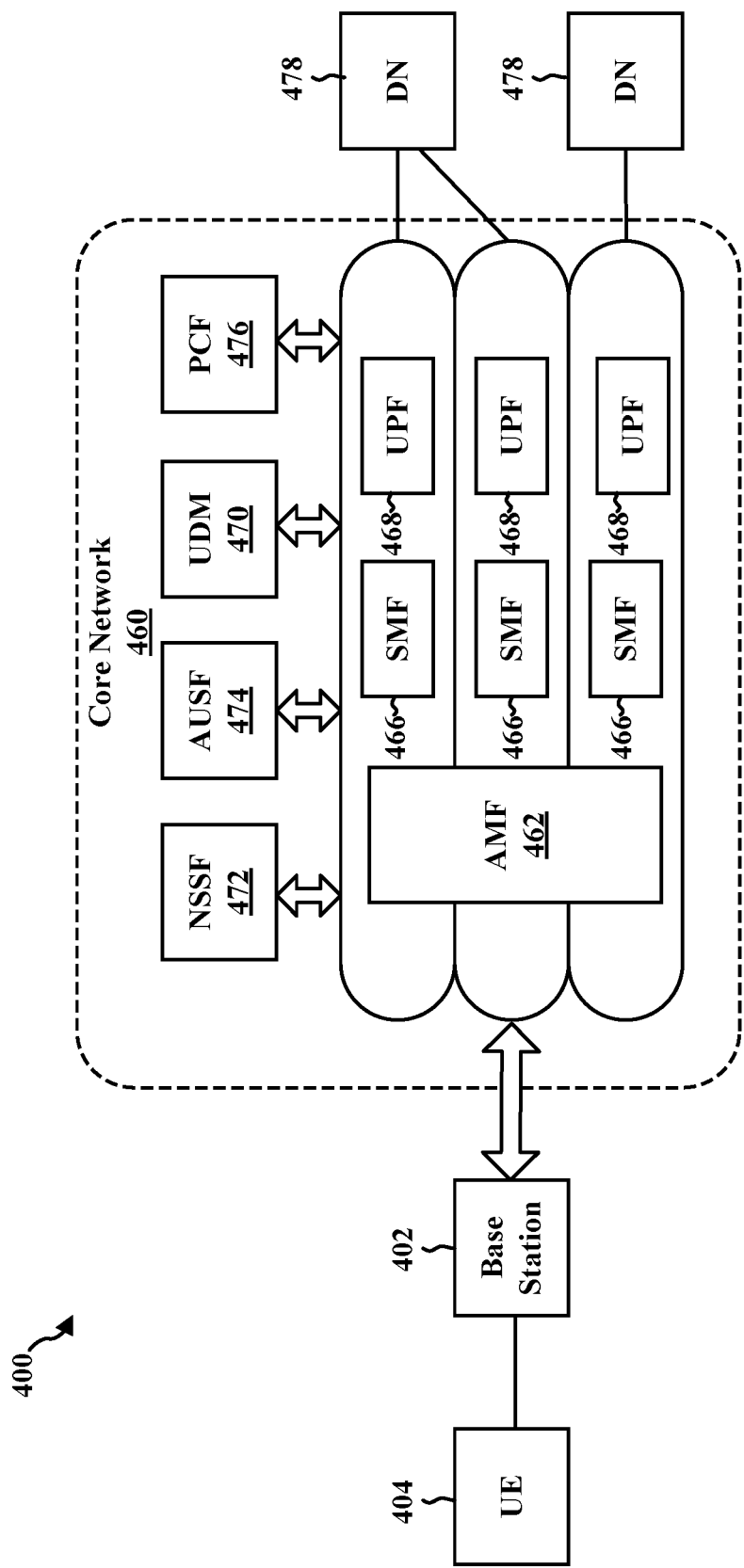
FIG. 4 is a diagram illustrating an example wireless communication system that supports network slicing.

FIG. 4 is a diagram illustrating an example wireless communication system 400 that may support network slicing in accordance with some aspects of the disclosure.

A network slice may be viewed as a logical end-to-end network that can be dynamically created. A given UE 404 may access multiple slices over the same interface via a base station 402 (e.g., the base station 102, 180, or 310), for example. Each slice may serve a particular service type with a set service-level agreement (SLA). A network slice may be defined within a public land mobile network (PLMN) and include the core network control plane function and user plane network function, as well as the core network 460 (e.g., core network 190 or EPC 160 in FIG. 1). The AMF 462 instance that is serving the UE 404 may be common (or logically belong) to all network slice instances (NSIs) that are serving the UE 404.

Identification of a network slice instance (NSI) may be performed via the Single Network Slice Selection Assistance Information (S-NSSAI) included in a PDU session request sent by the UE 404 to the network. The NSSAI may include a collection of S-NSSAIs. There may be multiple S-NSSAIs in the NSSAI sent in signaling messages between the UE 404 and the network. The S-NSSAI signaled by the UE 404 may assist the network in selecting a particular NSI. An S-NSSAI may include a Slice/Service type (SST). The SST may refer to the expected network slice behavior in terms of features and services. The SST may also include a slice differentiator (SD), which may include optional information that complements the Slice/Service type(s) and may be used to differentiate among multiple network slices of the same SST.

The S-NSSAI may be associated with a PLMN (e.g., PLMN ID) and have network-specific values associated with a particular S-NSSAI or standard value associated with a particular S-NSSAI. An S-NSSAI that is associated with the UE's 404 particular PLMN may be included in a PDU session request.

The NSI for a UE 404 may be triggered as part of the registration procedure by the first AMF 462 that receives the registration request (e.g., PDU session request) from the UE 404. The AMF 462 may retrieve the network slices that are associated with the UE's 404 user subscription and interact with the network Slice Selection Function (NSSF) 472, the Authentication Server Function (AUSF) 474, the Unified Data Management (UDM) 470, and/or the Policy Control Function (PCF) 476 to select the appropriate NSI, e.g., based on particular S-NSSAIs, PLMN ID, etc. that are associated with the UE's 404 subscription and included in the PDU session request.

A PDU session may be associated with one S-NSSAI and one data network name (DNN). The establishment of a PDU session within the selected NSIs may be triggered when the AMF 462 receives a PDU session request from the UE 404. The AMF 462 may discover candidate Session Management Functions (SMF) 466 using multiple parameters including the S-NSSAI provided in the PDU session request from the UE 404. The AMF 462 may select the appropriate SMF 466 for the PDU session based on the S-NSSAI. The SMF 466 may select the User Plane Function (UPF) 468 based at least in part on the S-NSSAI included in the PDU session request. The UE 404 may begin transmitting data to the core network 460 after a PDU session with a Data Network (DN) 478 is established in a network slice. The S-NSSAI associated with a PDU session is provided to the core network 460, and policy and charging entities may apply specific NSI policies associated with the UE's 404 subscription.

Figure 6:
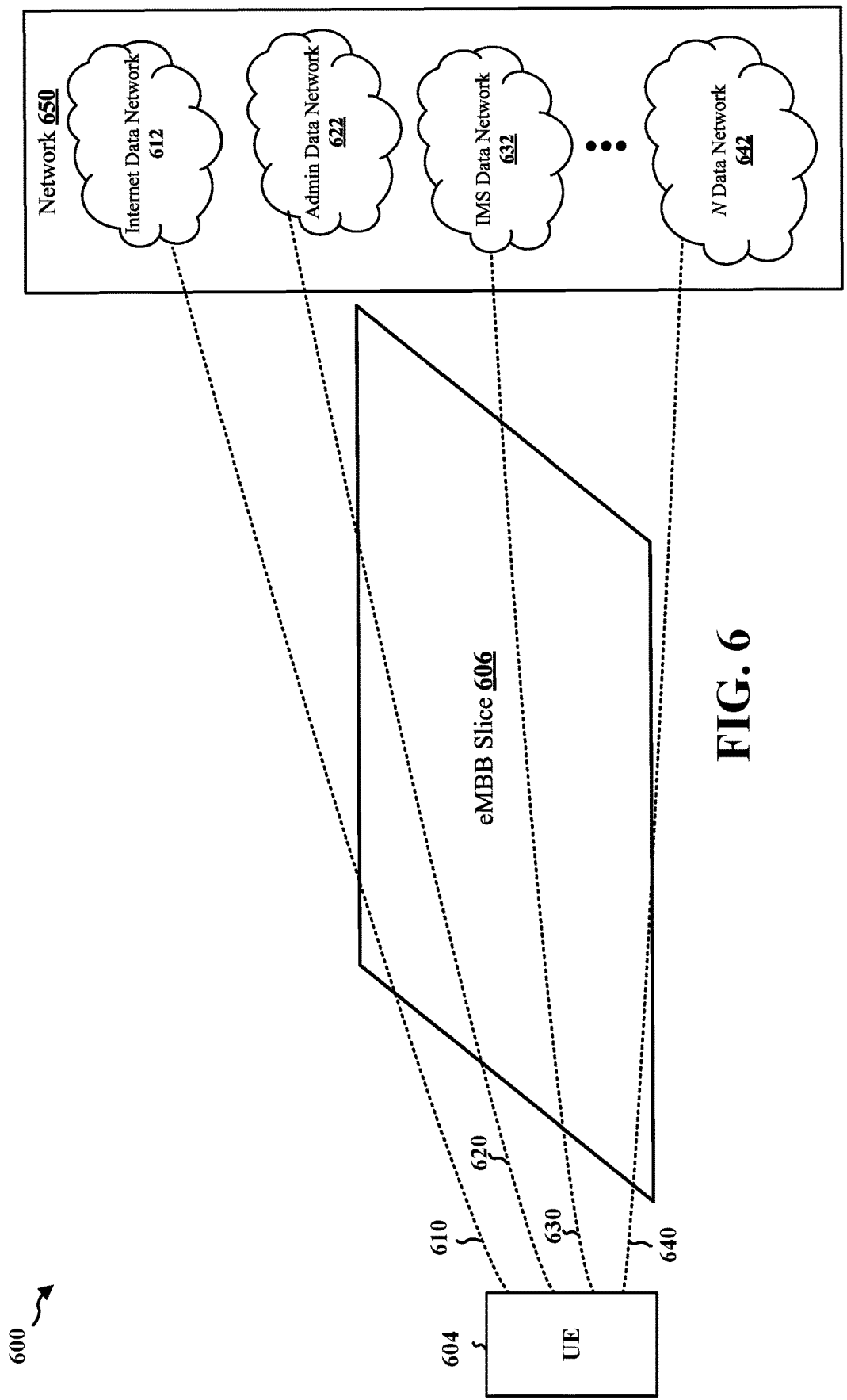
FIG. 6 illustrates a conceptual diagram of a slicing example that includes a single slice for a device.
Figure 8:
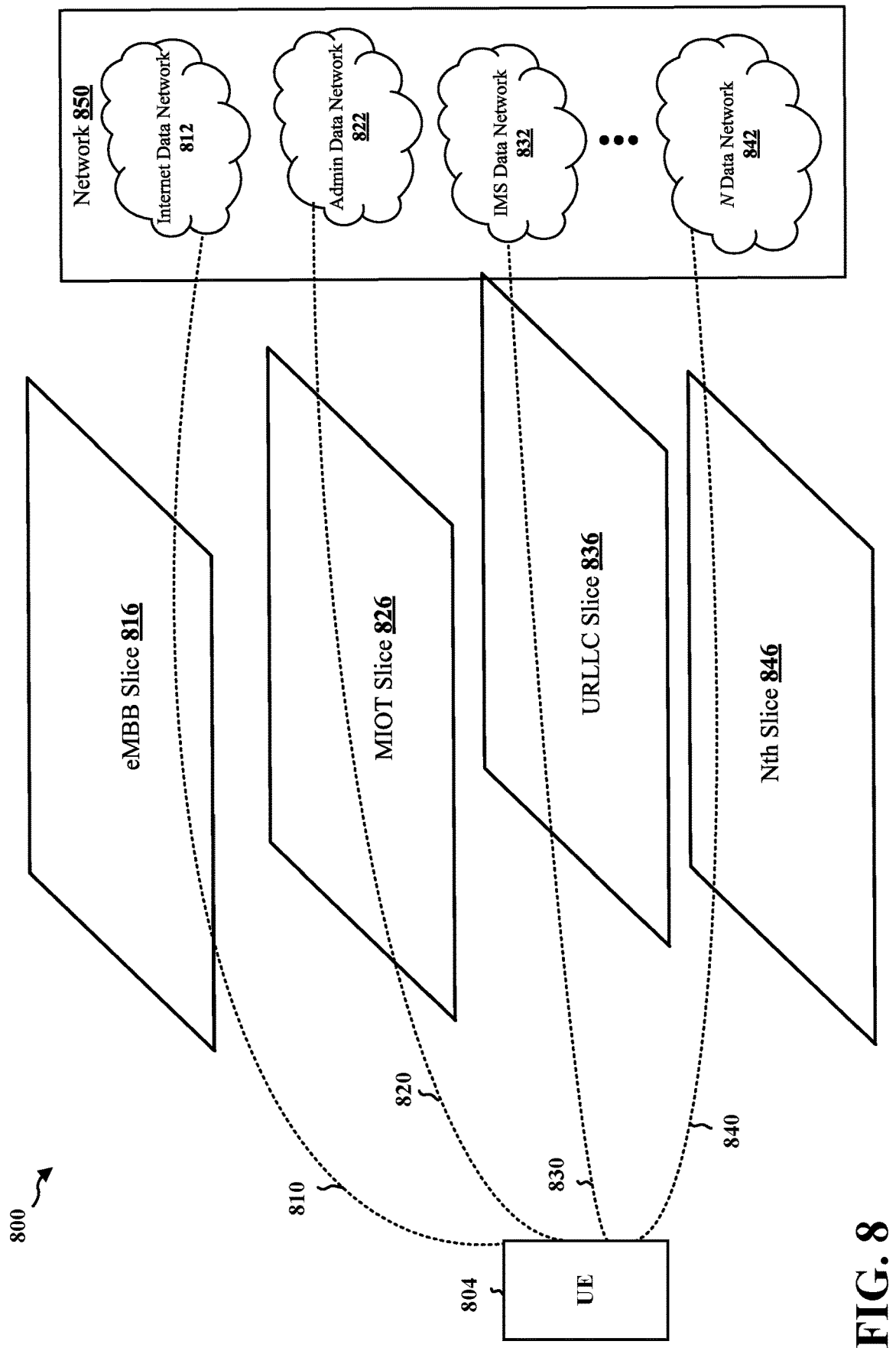
FIG. 8 illustrates a conceptual diagram of a slicing example that includes a single slice for different DNNs.

A UE may employ a policy framework, which may be referred to as a UE route selection policy (URSP), to communicate with a data network using network slicing. The UE may use slicing at a device level in which the device is configured to use a single slice. FIG. 6 illustrates an example showing that one slice 606 may be used for the UE 604, which may be referred to as device level slicing. In another example, the UE may use slicing at an access point name (APN) and/or DNN level in which each DNN may be associated with a different slice. FIG. 8 illustrates a slicing example that includes different slices for different DNNs, which may be referred to as DNN level slicing.

Aspects presented herein enable the UE to achieve a finer slicing granularity, e.g., that may enable different slices to be used for different applications. As described in connection with FIG. 5, the applications 502 and 504 may use socket application programming interface (API) on the HLOS 506 to send and receive data on the data pipe 550. The modem 508 may not have knowledge about the applications (e.g., 502 or 504) on the HLOS 506 using the data pipe 550.

Figure 5:
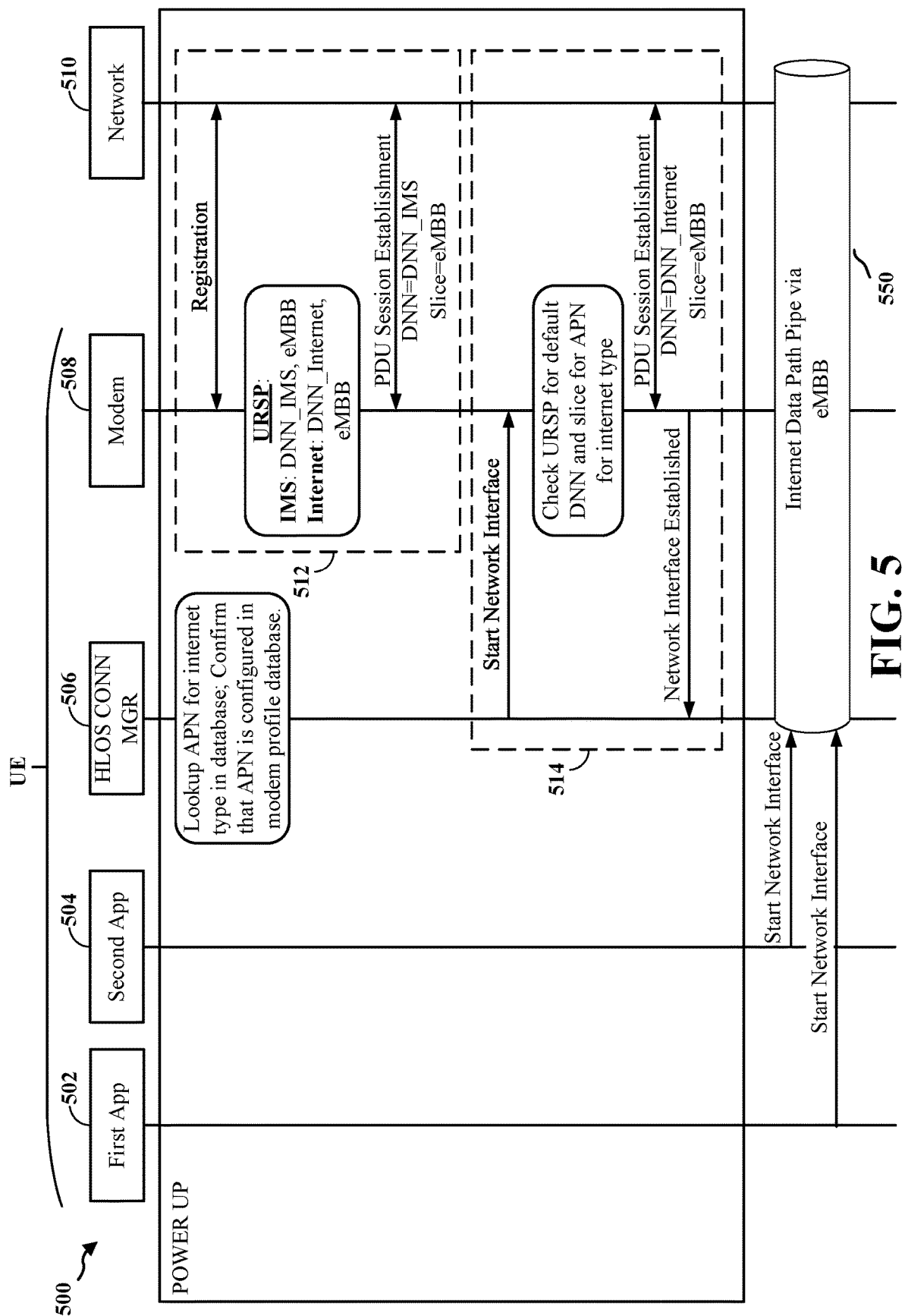
FIG. 5 is a call flow diagram illustrating example signaling for establishing a slice over which applications on a UE can communicate.

FIG. 5 is a call flow diagram illustrating example signaling 500 for establishing a slice over which applications on a UE (e.g., the UE 104 of FIG. 1 or the UE 350 of FIG. 3) can communicate. In this example, the UE may include multiple applications (apps), such as a first application 502, a second application 504, a high-level operating system (HLOS) connection manager 506, which may be any suitable operating system component, and a modem 508 (e.g., the controller/processor 359 of FIG. 3) configured to communicate with a network 510 (e.g., the base station 102 or 180 of FIG. 1 or the base station 310 of FIG. 3). The HLOS and the modem may use a defined framework for establishing an internet PDU, for example. Once the modem 508 sets up the Internet PDU, a data pipe 550 may be established across the HLOS 506, the modem 508, and the network 510, to enable the exchange of data between the applications 502 and 504 and the network 510.

The first application 502 and the second application 504 on the UE may communicate with the network 510 via the HLOS connection manager 506 and the modem 508. In some examples, the modem 508 is configured to identify an application that is the source/destination of a data packet. For example, the association between the data packet and the application may be identified by having the HLOS pass an application identifier (ID) (e.g., APP_1 for the first application 502, and APP_2 for the second application 504) of the application along with the data packet. Each data packet may be tagged with the identifier. That is, the data packet may be communicated from the HLOS 506 to the modem 508 along with an identifier (e.g., a tag) as an auxiliary data field which associates the data packet with the application.

Initially, upon power up of the UE, there may be no connected interface between the UE and the network 510. Accordingly, the modem 508 and the network 510 may perform a modem initialization 512 wherein a registration is performed between the modem 508 and the network 510. In an HLOS internet establishment 514, the HLOS connection manager 506 and the modem communicate to establish a connection interface between the UE and the network 510. Prior to performing the HLOS internet establishment 514, the HLOS connection manager 506 may look up an APN for an Internet type connection, wherein the APN is stored in a database maintained by the HLOS connection manager 506. The HLOS connection manager 506 may then confirm that the APN is configured in a modem profile database maintained by the modem 508.

In some aspects, the modem 508 does not establish an internet connection to facilitate internet communication between the modem 508 and the network 510 at the modem initialization 512. In such aspects, in the HLOS internet establishment 514, the HLOS connection manager 506 requests that the modem 508 start an internet interface with the network 510. Upon receiving the request, the modem 508 may check a URSP received from the network 510 during the modem initialization 512 to determine a data network name (DNN) and slice for the Internet type connection with the APN. The URSP provides the modem with default slice for the Internet type connection with the APN. The modem 508 can then establish a protocol data unit (PDU) session with the network 510 to establish the Internet type connection using the eMBB slice. Once the PDU session is established, the modem 508 may notify the HLOS connection manager 506 that the session is established.

Once the network internet interface is established during the HLOS internet establishment 514, an internet data path pipe is established between the HLOS connection manager 506, the modem 508, and the network 510. Thus, the first application 502 and the second application 504 can begin to use the internet data path pipe to communicate data between the applications and the network 510.

In an example shown in FIG. 6, one slice may be used for the UE 604, which may be referred to as device level slicing. In another example, one slice may be supported for each DNN of the UE, e.g., with a single slice at a time. For example, a single UE may use multiple DNNs (e.g., an admin data network, an internet data network, an IP multimedia system (IMS) data network, etc.), wherein each of the multiple DNNs use the same slice (e.g., eMBB slice).

FIG. 6 illustrates a conceptual diagram of a slicing example 600 that includes a single slice for a device, e.g., the UE 604. Various applications at the UE 604 may exchange communication with the network 650 and more particularly to different data networks. For example, a first application may exchange first communication 610 with an internet data network 612, a second application may exchange second communication 620 with an administrative data network 622, a third application may exchange third communication 630 with an IMS data network 632, etc. For example, an Nth application may exchange communication 640 with an Nth data network 642. The UE 604 may use a single network slice 606 for exchanging the communication 610, 620, 630 and 640 of the different applications with the different data networks (e.g., 612, 622, 632, and 642). Although FIG. 6 illustrates the single network slice 606 as an eMBB slice, this is merely one example. The device level network slice may correspond to a different type of network slice than the eMBB network slice illustrated in FIG. 6.

Figure 7:
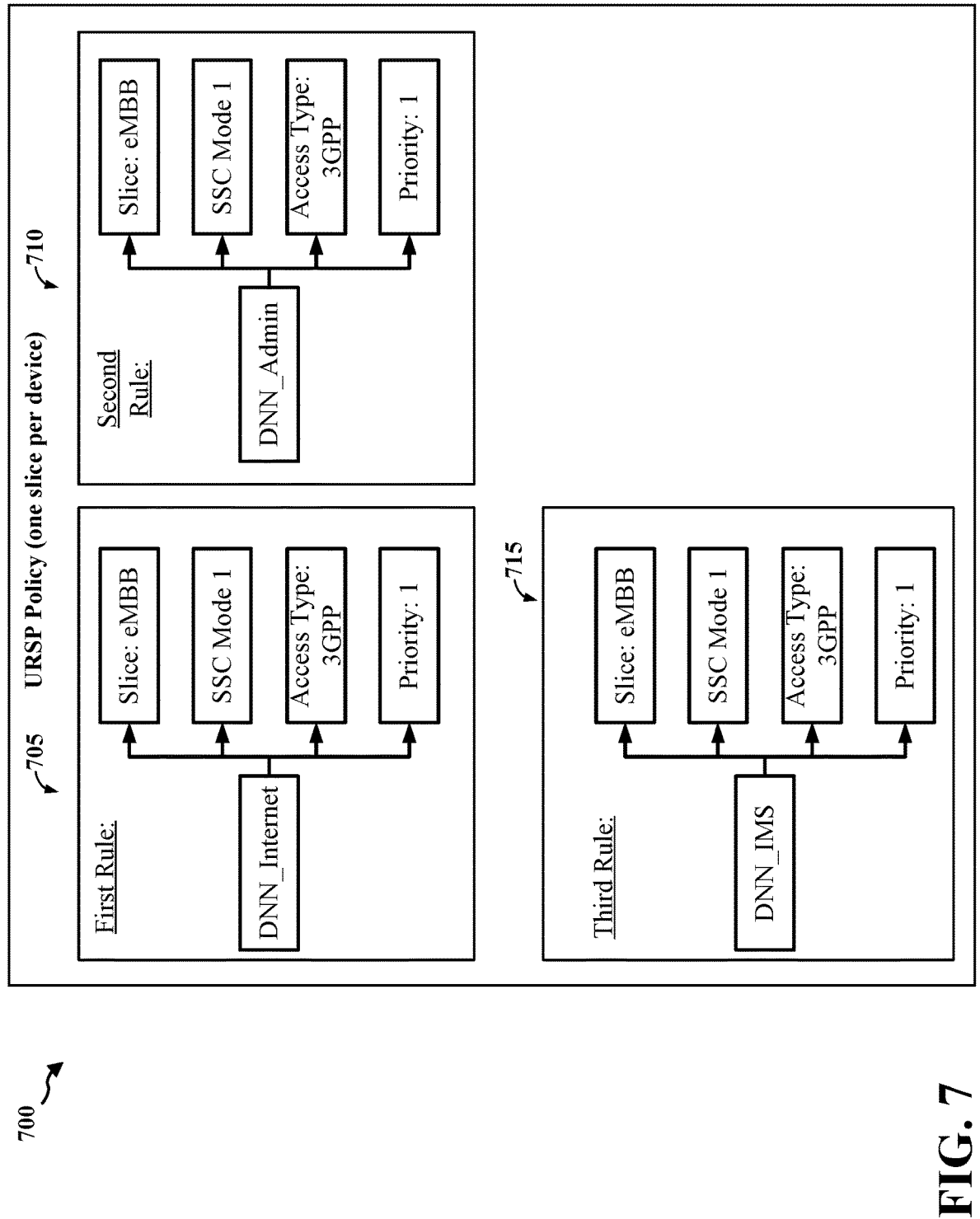
FIG. 7 illustrates an example UE route selection policy (URSP) policy for a single slice per device.

FIG. 7 illustrates an example URSP policy 700 for a single slice per device, as illustrated in FIG. 6. The URSP policy 700 may include multiple rules indexed by a traffic descriptor. For example, a first rule 705 may be indexed by traffic descriptor "DNN_Internet." A second rule 710 may be indexed by traffic descriptor "DNN_Admin." A third rule 715 may be indexed by traffic descriptor "DNN_IMS." As shown, each rule may include one or more of a corresponding slice, a corresponding session and service continuity (SSC) mode, an access type, and/or a priority. Additional identifiers, modes, types, etc. may also be added to the rules without departing from the novel features disclosed herein. In this example, each of the rules for the different DNNs may share a same slice, e.g., the eMBB slice (such as the eMBB slice 606 in FIG. 6).

FIG. 8 illustrates a conceptual diagram of a slicing example 800 that includes a single slice for different DNNs, e.g., DNN level slicing. Various applications at the UE 804 may exchange communication with the network 850 and more particularly to different data networks. For example, a first application may exchange first communication 810 with an internet data network 812; a second application may exchange second communication 820 with an administrative data network 822; a third application may exchange third communication 830 with an IMS data network 832, etc. For example, an Nth application may exchange communication 840 with an Nth data network 842. As illustrated in FIG. 8, the UE 804 may use different network slices 816, 826, 836, 846 for exchanging the communication 810, 820, 830 and 840 of the different applications with the different data networks (e.g., 812, 822, 832, and 842).

Figure 9:
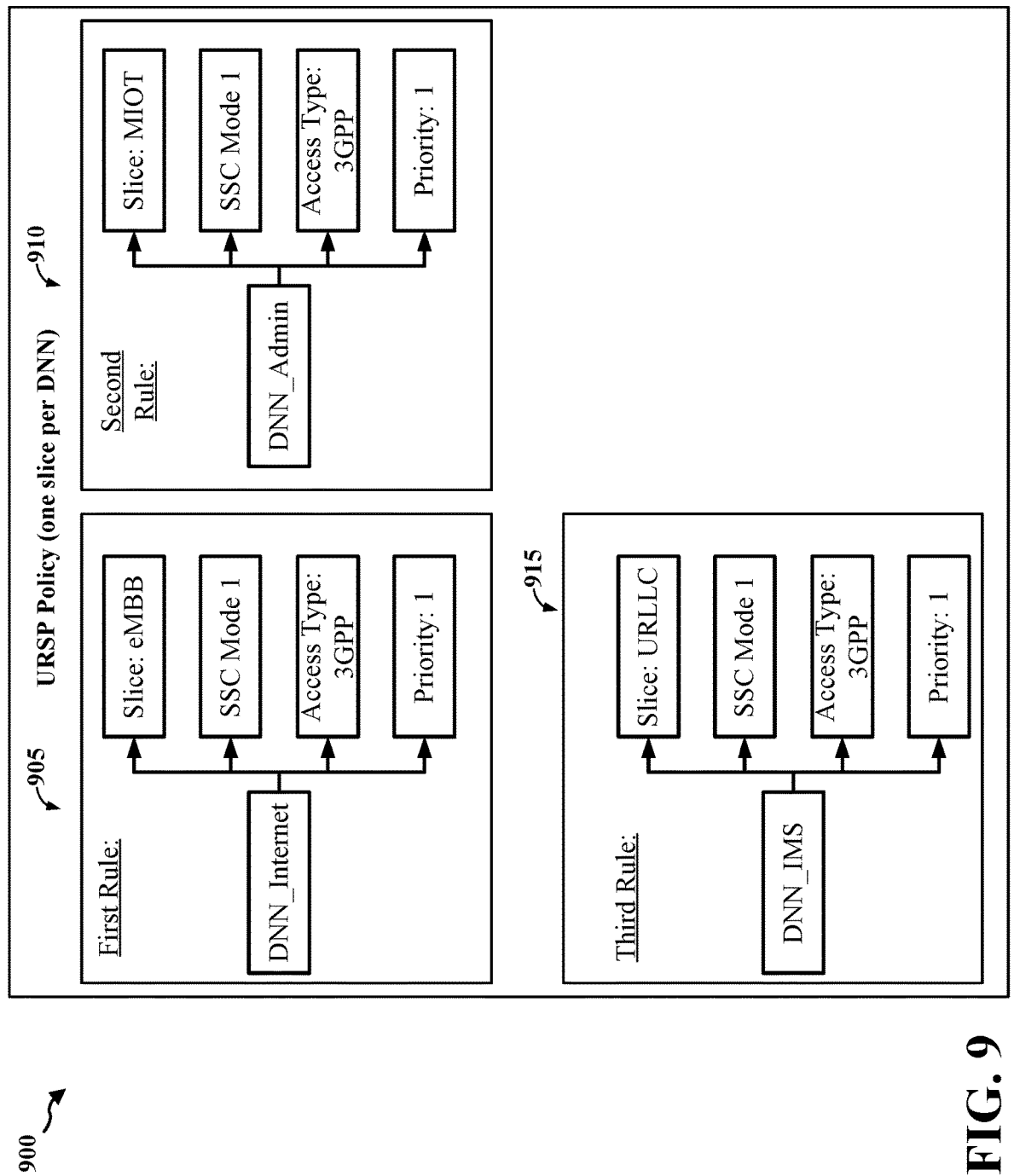
FIG. 9 illustrates an example URSP policy for a single slice per DNN.

FIG. 9 illustrates an example URSP policy 900 for a single slice per DNN, as illustrated in FIG. 8. The URSP policy 900 may include multiple rules indexed by a traffic descriptor. For example, a first rule 905 may be indexed by traffic descriptor "DNN_Internet." A second rule 910 may be indexed by traffic descriptor "DNN_Admin." A third rule 915 may be indexed by traffic descriptor "DNN_IMS." Thus, traffic descriptor for each rule may be based on a DNN. As shown, each rule may include one or more of a corresponding slice, a corresponding session and service continuity (SSC) mode, an access type, and/or a priority. Additional identifiers, modes, types, etc. may also be added to the rules without departing from the novel features disclosed herein. In this example, different DNNs may be associated with different slices. For example, the Internet DNN may be associated with the eMBB slice, the administrative DNN may be associated with an MIOT slice, and the IMS DNN may be associated with an URLLC slice. Each DNN may be associated with a single slice.

Figure 10:
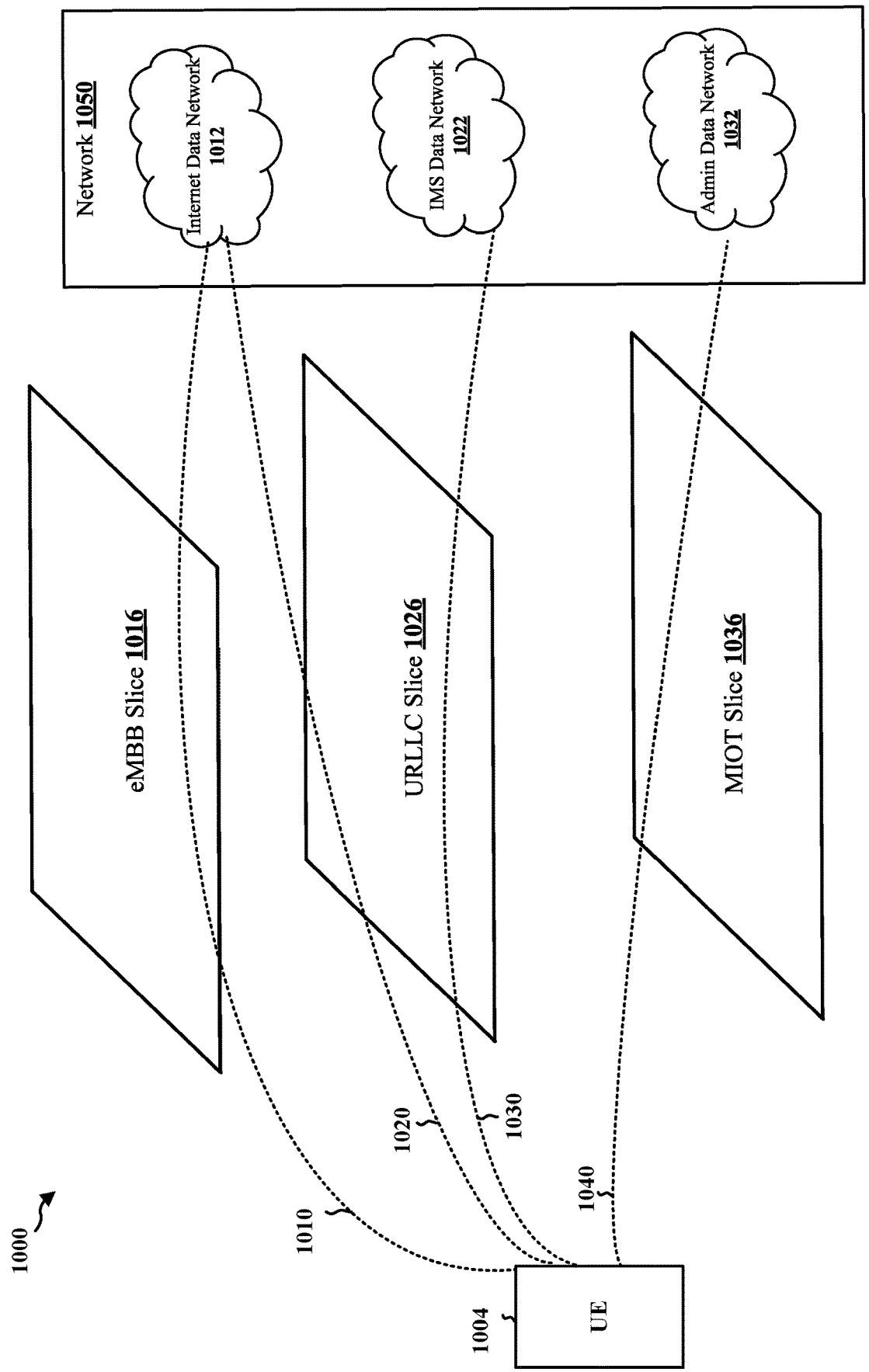
FIG. 10 illustrates a conceptual diagram of a slicing example that includes additional granularity beyond a single slice for different DNNs.

However, some applications may benefit from use of a different slice for a DNN such as the Internet, such as URLLC, which may not be possible if the UE is limited to use a single eMBB slice for the Internet. Aspects presented herein enable a UE to use different slices for different applications through the use of a pseudo DNN identifier. Thus, aspects presented herein enable the UE to establish connections over multiple slices with a single DNN, e.g., using different slices for different applications. FIG. 10 illustrates a conceptual diagram of a slicing example 1000 that includes additional granularity beyond a single slice for different DNNs, e.g., application level slicing. Various applications at the UE 1004 may exchange communication with the network 1050 and more particularly to different data networks. For example, a first application may exchange first communication 1010 with an internet data network 1012, a second application may exchange second communication 1020 also with the internet data network, a third application may exchange data 1030 with an IMS data network 1022, a four application may exchange fourth communication 1040 with an administrative data network 1032, etc. As illustrated in FIG. 10, the UE 1004 may use different network slices 1016, 1026, and 1036 for exchanging the communication, e.g., 1010, 1020, 1030 and 1040, of the different applications with the different data networks. Additionally, in FIG. 10, the UE 1004 may use different slices (e.g., eMBB slice 1016 for a first application and URLLC slice 1026 for a second application) for data exchanged with the same DNN (e.g., the internet data network 1012).

Figure 11:
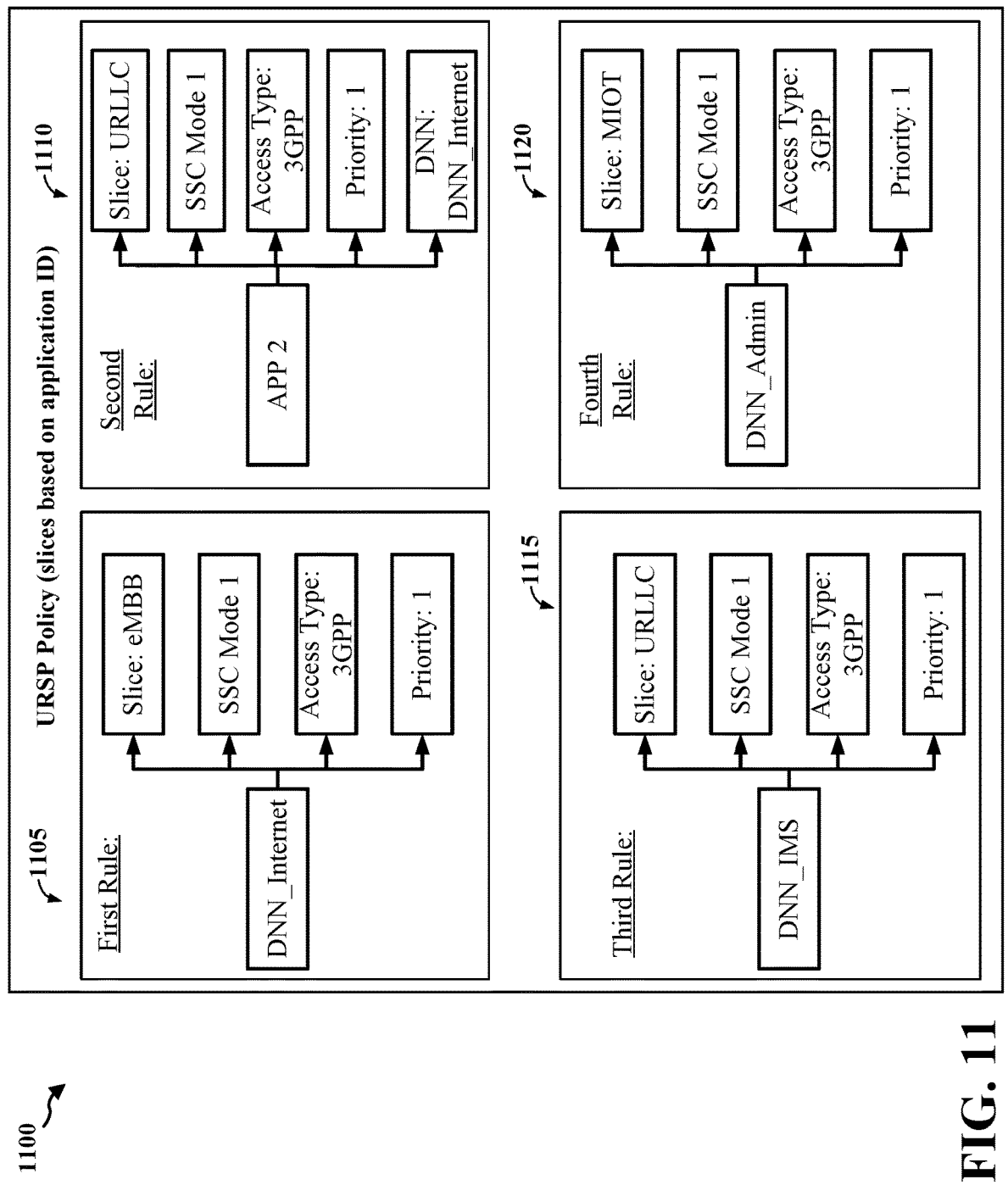
FIG. 11 illustrates an example URSP that enables multiple slices to be configured based on an application ID.

FIG. 11 illustrates an example URSP 1100 that enables multiple slices to be configured as illustrated in FIG. 10 based on an application ID. The URSP policy 1100 a first rule 1105, a third rule 1115, and a fourth rule 1120 indexed based on a DNN. In contrast, a second rule 1110 may be indexed by an application ID, e.g., "APP 2," which may identify a particular application at the UE. As illustrated in second rule 1110, the DNN for APP 2 is DNN_Internet. In this example, the first rule 1105 may be applied for a general application exchanging communication with the internet data network (e.g., communication 1010), and the second rule 1110 may be applied for a particular application that exchanges communication (e.g., communication 1020) with the internet data network. As shown, each rule may include one or more of a corresponding slice, a corresponding session and service continuity (SSC) mode, an access type, and/or a priority. Additional identifiers, modes, types, etc. may also be added to the rules without departing from the novel features disclosed herein.

However, some UEs may not support URSP for network slicing based on application IDs, such as the second rule 1110 in FIG. 11. Aspects presented herein enable a UE to establish connections over multiple slices with a single DNN, e.g., using different slices for different applications. Thus, aspects of the present disclosure enable the UE to exchange data with a data network, such as an internet data network using different slices for particular applications, such as using an URLLC slice for one or more applications and an eMBB slice for other applications.

The UE may support DNN based slices, such as described in connection with FIGS. 8 and 9 that achieve the effect illustrated in FIG. 10 through the use of a DNN identifier that provides additional slice granularity for communicating with a same DN. The identifier may be referred to as a "pseudo DNN."

A modem may support DNN based slices, such as described in connection with FIGS. 8 and 9, using a separate slice for different DNNs. A reference code may be provided to create a new parameter in a network request from an application to an operating system to establish a new network interface API. For example, an original equipment manufacturer (OEM) may provide the new reference code for the new parameter to bring up a new interface API for an application. The reference code may cause the operating system and RIL to pass the new parameter(s) to the modem for further processing. For example, the operating system and the RIL may pass the new parameter(s) to the modem for further processing. An application may be provided with a DNN ID that indicates not only the DNN, but also a particular network slice. The DNN ID may be referred to as a pseudo DNN, as it may be different than the actual DNN ID for the corresponding DNN. The application may pass the pseudo DNN ID to the operating system while calling a bring up network interface API on an HLOS, for example. The application may pass the pseudo DNN ID along with other information/parameter(s), which may be referred to as service information. When the modem receives the new parameter(s) including the pseudo DNN ID, the modem may validate the pseudo DNN ID with the other information in the parameters by referring to the URSP. If the information passes the validation, the modem may proceed to establish a PDU session to the network using the pseudo DNN ID and an S-NSSAI (e.g., slice) determined from the URSP rules. The network may map multiple pseudo DNN IDs to the same DNN and/or may map multiple slice identifiers (e.g., S-NSSAI) to the same slice treatment, or any other mapping.

Figure 12:
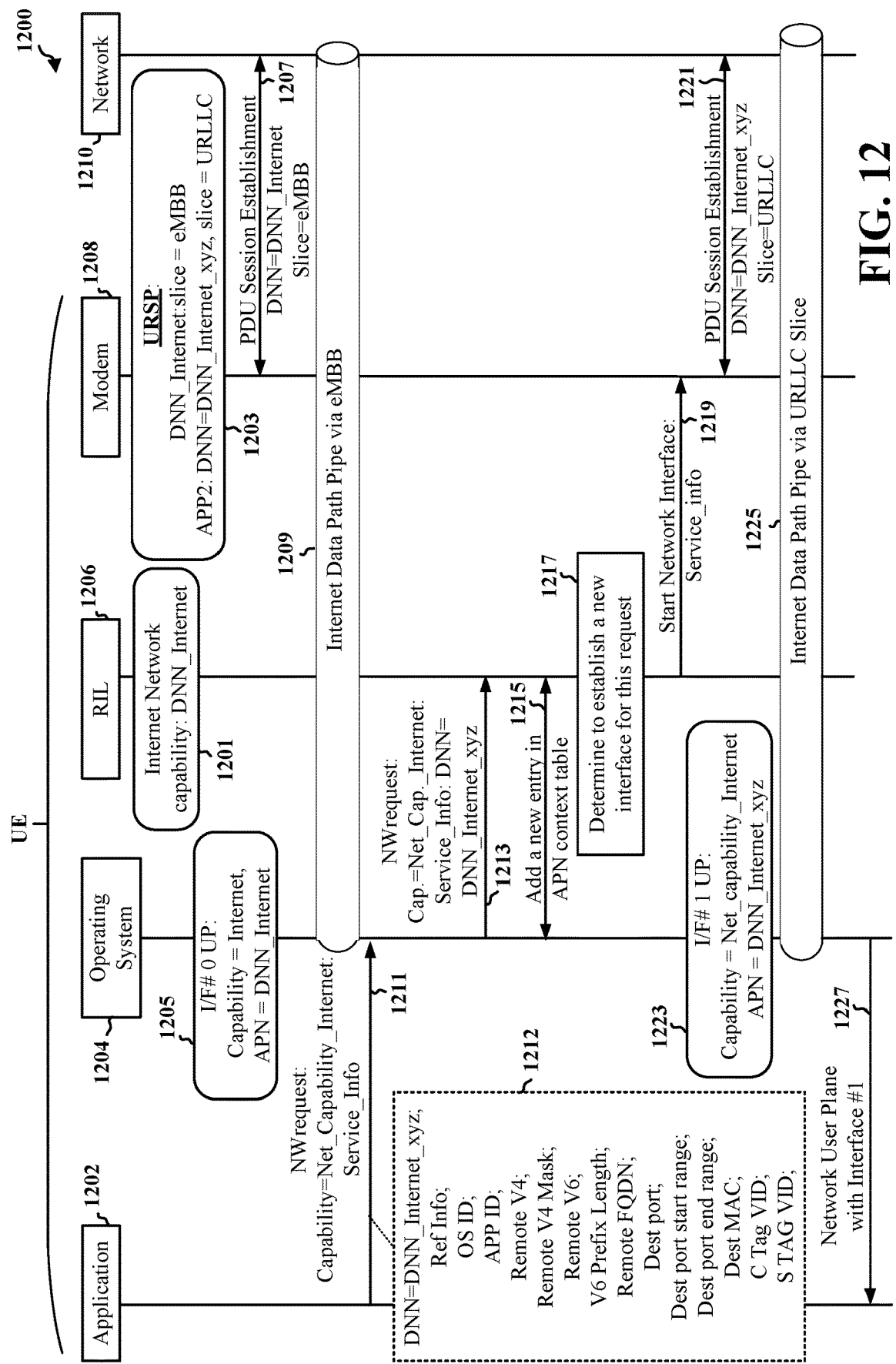
FIG. 12 illustrates an example call flow using a pseudo DNN identifier for establishing a slice over which applications on a UE can communicate.

FIG. 12 illustrates an example call flow 1200 using such an identifier for establishing a slice over which applications on a UE (e.g., the UE 104 of FIG. 1 or the UE 350 of FIG. 3) can communicate. Although a single application 1202 is illustrated to describe the concept, the UE may include multiple applications. The UE includes an operating system 1204 framework, which may correspond to the HLOS connection manager 506 described in connection with FIG. 5. The UE includes a radio interface layer (ML) 1206 and a modem 1208 (e.g., the controller/processor 359 of FIG. 3) configured to communicate with a network 1210 (e.g., via the base station 102 or 180 of FIG. 1 or the base station 310 of FIG. 3). The operating system 1204, the RIL 1206, and the modem 1208 may use a framework for establishing an internet PDU.

Initially, the interfaces may be down on the operating system 1204, e.g., as described in connection with FIG. 5. The RIL 1206 may have an internet network capability (e.g., "NET_CAPABILITY_INTERNET") for an internet DNN (e.g., DNN_Internet), e.g., as shown at 1201. Although not illustrated in FIG. 12, the modem 1208 may register with the network 1210, such as described in connection with FIG. 5. The network 1210 may provide the modem 1208 with a URSP 1203. The modem 1208 may use the URSP to determine network slices to use for communication with the network. For example, the URSP 1203 indicates for traffic with the DNN_Internet, the eMBB slice is to be used. The URSP indicates that for a different DNN ID (e.g., DNN_Internet_xyz), the URLLC slice is to be used. A particular application, such as the application 1202 may use the DNN ID DNN_Internet_xyz as an additional identifier for DNN_Internet. As the DNN ID used by the application 1202 is different than the typical, standard DNN for the DNN_Internet, the identifier DNN_Internet_xyz may be referred to as a pseudo ID for DNN_Internet.

At 1205, an interface (e.g., Interface #0) may be UP with a capability for Internet communication, and the APN may indicate DNN_Internet that according to the URSP 1203 is associated with the eMBB network slice. A first internet data path pipe 1209 for the eMBB slice may be established between the operating system 1204 and the network 1210. The establishment of the data path pipe 1209 may include aspects similar to the establishment of the data path pipe 550 in FIG. 5. Once established, the application 1202 may send communication via the operating system 1204 to the network 1210. The data passes through the pipe without having more interaction with the modem. The modem may have little information or knowledge about the application(s), and therefore it may be difficult to provide application level network slicing, as illustrated in FIG. 11.

Even though an internet data path pipe 1209 is already established, and may be used by other applications, when the application 1202 has data to exchange with the DNN_Internet, may send a network request API 1211 to the operating system to establish an additional internet data path pipe with the DNN_Internet using a different slice (e.g., the URLLC slice). The network request API 1211 may include capability information that indicates an internet network capability (e.g., NET_CAPABILITY_INTERNET") and may further include service information 1212. The application 1202 may have information from a carrier, for example, to know which service information to include in the API to cause a particular data path pipe to be established between the operating system 1204 and the network 1210. As part of the service information, the application may indicate the pseudo DNN ID (e.g., "DNN_Internet_xyz") in the network request 1211, such as illustrated in service information 1212. The service information 1212 may also include reference information. The reference information may be used, e.g., by the modem 1208, to determine whether or not the application 1202 is allowed to use the DNN (e.g., "DNN_Internet_xyz"). For example, the service information may include any of an operating system ID (e.g., OS ID); an application ID (e.g., APP ID); remote IPv4 information indicating the remote IPv4 address to which the application wants to connect; an IPv4 address mask for the IPv4 address that may specify a wildcard range for the address; remote IPv6 information; a prefix length of the IPv6; a remote fully qualified domain name (FQDN), a destination port, a destination port range, e.g., including a destination port range lower limit and/or a destination port range higher limit; a destination MAC address for non-IP packets; a virtual local area network identifier (VID) of a customer virtual local area network (VLAN) tag, and/or a VID of a service VLAN tag. Table 1 provides an example of service information 1212 that may be included in the network request API 1211, and Table 2 provides an example set of reference information parameters that may be included in the service information 1212. The example parameter names in Tables 1-5 are to illustrate the concept, and the concepts presented herein are not limited to the specific parameter names.

TABLE 1

| Parameter | Type |
|---|---|
| DNN | String |
| ReferenceInfo | ServiceReferenceInfo, see Table 2 |

TABLE 2

| Parameter | Type |
|---|---|
| OsIdAppID: 16 bytes of Operating System Identifier + Application Identifier | byte[ ] |
| AppId: Application Identifier | byte[ ] |
| RemoteV4: remote IPv4 address | RemoteV4Address[ ] Table 3 |
| RemoteV6: remote IPV6 | RemoteV6Address[ ] Table 4 |
| RemoteFQDN: Remote FQDN | string[ ] |
| DestPort: destination port | int[ ] |
| DestPortRange | PortRange[ ] Table 5 |
| DestMAC: destination MAC address for non-IP packets | string[ ] |
| CTagVID: VID of the customer-VLAN tag | int[ ] |
| STagVID: VID of the service-VLAN tag | int[ ] |

TABLE 3

| RemoteV4Address | |
|---|---|
| Parameter | Type |
| RemoteIPV4: remote IPv4 address | string |
| RemoteV4Mask: IPV4 address mask | string |

TABLE 4

| RemoteV6Address | |
|---|---|
| Parameter | Type |
| RemoteIPV6 | string |
| V6PrefixLength: prefix length of the IPV6 | int |

TABLE 5

| PortRange | |
|---|---|
| Parameter | Type |
| DestPortRangeStart: destination port range low limit | int |
| DestPortRangeEnd: destination port range high limit | int |

As an example, the application ID in the service information 1212 may be used to determine whether the application 1202 is allowed to use the indicated DNN. In FIG. 12, the URSP includes information that an application having an application ID "APP2" is authorized to use the DNN ID DNN_Internet_xyz. Therefore, the modem 1208 may verify that the application ID in the service information 1212 matches "APP2" in order to determine that the application 1202 is allowed to use the DNN ID "DNN_Internet_xyz" before continuing to establish the data path pipe using DNN_Internet_xyz.

In response to the network request API 1211, the operating system 1204 provides the service information to the RIL 1206. For example, the operating system 1204 may pass the network request information 1213 to the RIL. The network request information 1213 may include the information, such as the service information 1212, provided by the application 1202 in the network request API 1211. The operating system 1204 and the RIL 1206 may exchange information to add a new entry in the APN context table, at 1215. The RIL 1206 may then determine to establish a new interface, e.g., if there is no interface established for the DNN ID included in the service information. As the internet data path pipe 1209 is for the identifier "DNN_Internet," the RIL 1206 determines, at 1217, to establish a new interface in response to receiving the request with the new DNN ID "DNN_Internet_xyz."

In response to determining to establish a new interface, at 1217, the RIL sends an indication to the modem to start establishing the network interface, at 1219. The indication passes the service information 1212, to the modem 1208. In response, the modem 1208 uses the application ID to validate the DNN ID in the service information, e.g., using the URSP to check that the application ID is associated with the indicated DNN ID. After validating the application ID, the modem 1208 establishes a PDU session, at 1221, with the network 1210 using the URSP and the indicated DNN ID. For example, in FIG. 12, the modem 1208 establishes the PDU session, at 1221, for using the URSP for DNN_Internet_xyz, which is a pseudo DNN ID for DNN_Internet using the URLLC network slice. The new interface (e.g., Interface #1) is UP, as indicated at 1223, having an internet network capability and APN for DNN_Internet_xyz. An internet data path pipe 1225 is established using the URLLC slice. The operating system 1204 may indicate to the application 1202, at 1227, the network user plane with the newly established interface (e.g., Interface #1). The application 1202 may then exchange data with the network (e.g., DNN_Internet) using the internet data path pipe 1225 via the URLLC slice.

Figure 13:
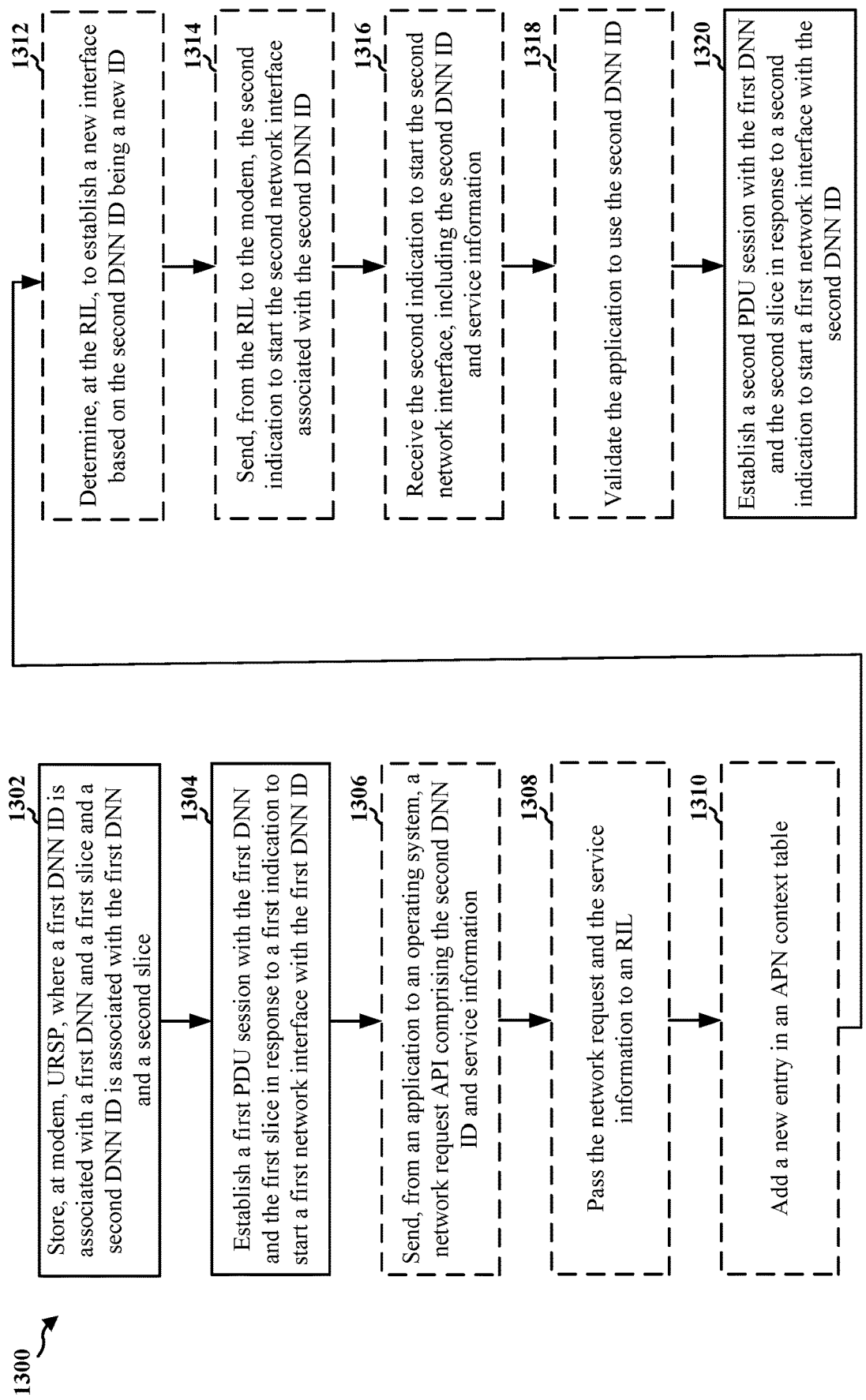
FIG. 13 is a flowchart of a method of wireless communication.

FIG. 13 is a flowchart 1300 of a method of wireless communication. The method may be performed at a UE (e.g., the UE 104, 350; the components described in connection with FIG. 5 or FIG. 12; apparatus 1402; a processing system, which may include the memory 360 and which may be the entire UE 350 or a component of the UE 350, such as the TX processor 368, the RX processor 356, and/or the controller/processor 359). Optional aspects are illustrated with a dashed line. The method may enable the UE to perform DNN level slicing while enabling particular applications to use a different slice than other applications to exchange communication with the same DNN.

At 1302, the UE stores, by a modem of the UE, a URSP, the URSP associating each of a plurality of DNN identifiers and a corresponding slice, wherein a first DNN ID is associated with a first DNN and a first slice and a second DNN ID is associated with the first DNN and a second slice different than the first slice. The storage of the URSP may be performed, e.g., by the storage component 1440 of the apparatus 1402 in FIG. 14. The second DNN ID may be a pseudo DNN ID, e.g., as described in connection with FIG. 12. As an example, the first slice may be an eMBB slice. The second slice may be an URLLC slice, an MIoT slice, an operator defined proprietary slice, etc. In another example, the first slice may be a URLLC slice, and the second slice may be an eMBB slice, an MIoT slice, an operator defined proprietary slice, etc. In yet another example, the first slice may be an MIoT slice, and the second slice may be an eMBB slice, a URLLC slice, an operator defined proprietary slice, etc.

At 1304, the UE (e.g., the modem of the UE) establishes a first PDU session with the first DNN and the first slice in response to receiving a first indication to start a first network interface associated with the first DNN ID. The first PDU session may be an eMBB PDU session, such as described in connection with 1207 in FIG. 12. The PDU session may be established, e.g., by the PDU session component 1442 of the apparatus 1402 in FIG. 14.

At 1306, an application sends to an operating system, a network request API comprising the second DNN ID and service information. The application may correspond to the application 1202 in FIG. 12. The network request API may include aspects described in connection with 1211 in FIG. 12. The network request may be sent, e.g., by the network request API component 1446 of the apparatus 1402 in FIG. 14, via the transmission component 1434 and the RF transceiver 1422.

At 1308, in response to receiving the network request at the operating system from the application, the operating system passes the network request and the service information to a RIL. The operating system may correspond to the operating system 1204 in FIG. 12. For example, the operating system of the apparatus 1402 or the operating system 1204 may send the network request 1213 to the ML 1206.

At 1310, the UE (e.g., the operating system and ML) add a new entry in an APN context table. For example, FIG. 12 illustrates the operating system 1204 and the RIL 1206 adding a new entry, at 1215, based on the indicated DNN ID not having a previous entry. The addition of the new entry may be performed, e.g., by the APN table component 1448 of the apparatus 1402 in FIG. 14.

At 1312, the ML determines to establish a new interface based on the second DNN ID being a new identifier without a previously established interface. The determination may include aspects described in connection with 1217 in FIG. 12, for example. The determination may be performed, e.g., by the determination component 1450 of the apparatus 1402 in FIG. 14.

At 1314, the ML sends to the modem, the second indication to start the second network interface associated with the second DNN ID. The second indication may correspond to the start network interface 1219 indication in FIG. 12. The second indication comprises the service information. Thus, the operating system 1204 and/or ML 1206 in FIG. 12 may send the second indication to the modem 1208. As another example, the operating system and the RIL 1452 of the apparatus 1402 may pass the service information received from the application to the modem.

At 1316, the UE (e.g., the modem of the UE) receives the second indication to start the second network interface. The indication may include the second DNN ID and service information. The service information may include one or more parameters described in connection with the service information 1212 in FIG. 12. For example, the service information may include one or more of an operating system identifier, an application identifier, remote IPv4 information, an IPv4 address mask, remote IPv6 information, an IPv6 prefix length, a remote FQDN, a destination port, a destination port range, a destination port range lower limit, a destination port range higher limit, a destination MAC address for non-internet protocol packets, a VID of a customer VLAN tag, or a VID of a service VLAN tag. For example, the reception may be performed, e.g., by the modem 1404 of the apparatus 1402.

The second indication may be initiated by an application, and as illustrated at 1314, the UE (e.g., the modem of the UE) may validate the application to use the second DNN ID before establishing the second session with the first DNN and the second slice, at 1320. The modem may validate, at 1318, the application to use the second DNN ID using the URSP and the service information received at 1316. The validation may be performed, e.g., by the validation component 1444 of the apparatus 1402 in FIG. 14. As an example, the modem may validate the application to use the second DNN ID using the URSP and an application identifier comprised in the service information.

At 1320, the UE (e.g., the modem of the UE) establishes a second PDU session with the first DNN and the second slice in response to receiving a second indication to start a second network interface associated with the second DNN ID. Example aspects of PDU session establishment are described in connection with 1221 in FIG. 12 and in connection with FIG. 5. The second PDU session may be established, e.g., by the PDU session component 1442 of the apparatus 1402 in FIG. 14.

Figure 14:
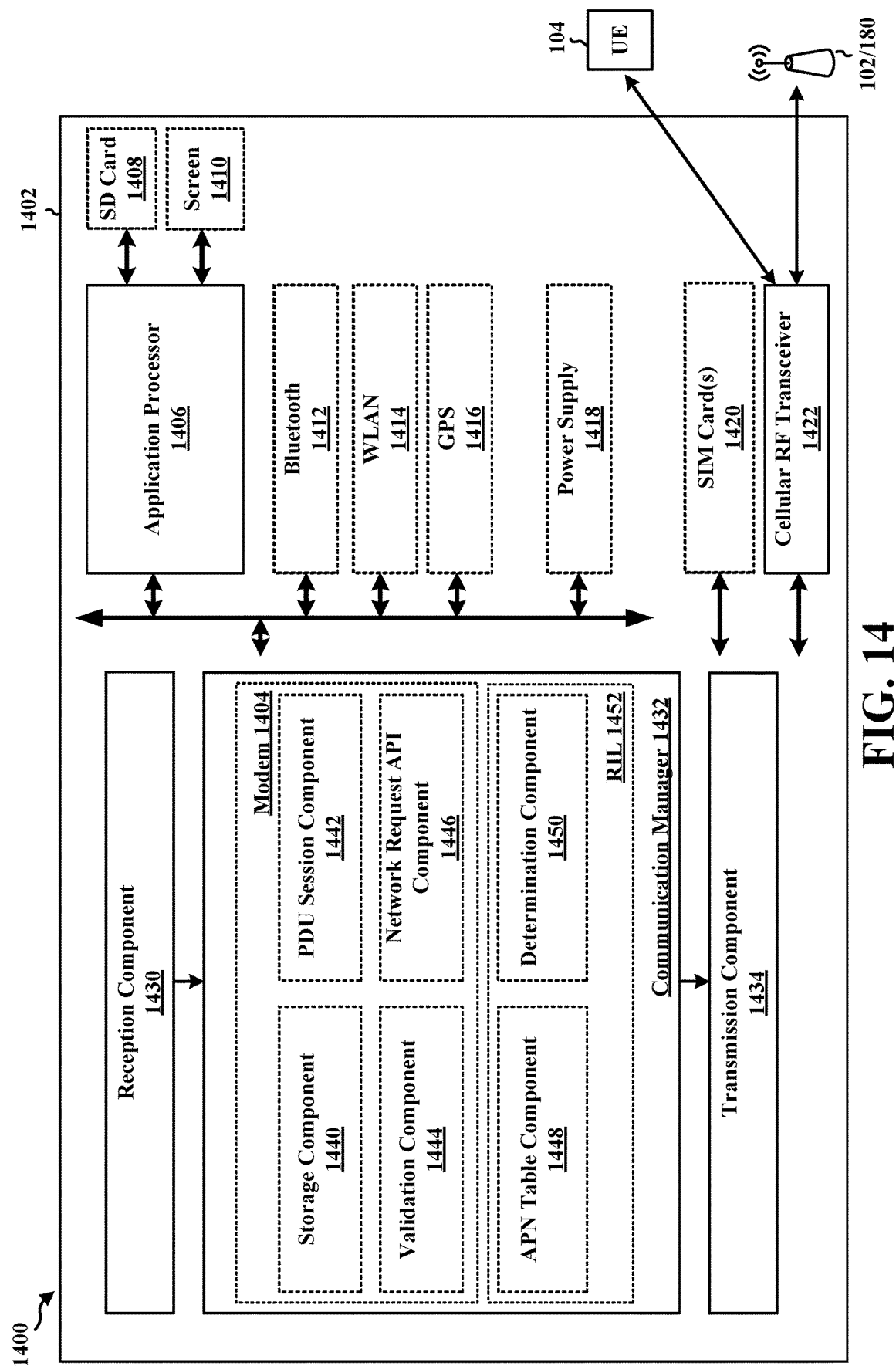
FIG. 14 is a diagram illustrating an example of a hardware implementation for an apparatus employing a processing system.

FIG. 14 is a diagram 1400 illustrating an example of a hardware implementation for an apparatus 1402. The apparatus 1402 may be a UE and includes a modem (which may also be referred to as a cellular baseband processor 1404) coupled to a cellular RF transceiver 1422. The apparatus 1402 may further include a RIL 1452. The apparatus 1402 may further include one or more subscriber identity modules (SIM) cards 1420, an application processor 1406 coupled to a secure digital (SD) card 1408 and a screen 1410, a Bluetooth module 1412, a wireless local area network (WLAN) module 1414, a Global Positioning System (GPS) module 1416, and/or a power supply 1418. The cellular baseband processor 1404 communicates through the cellular RF transceiver 1422 with the UE 104 and/or base station 102/180. The cellular baseband processor 1404 may include a computer-readable medium/memory. The computer-readable medium/memory may be non-transitory. The cellular baseband processor 1404 is responsible for general processing, including the execution of software stored on the computer-readable medium/memory. The software, when executed by the cellular baseband processor 1404, causes the cellular baseband processor 1404 to perform the various functions described herein. The computer-readable medium/memory may also be used for storing data that is manipulated by the cellular baseband processor 1404 when executing software. The cellular baseband processor 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the cellular baseband processor 1404. The cellular baseband processor 1404 may be a component of the UE 350 and may include the memory 360 and/or at least one of the TX processor 368, the RX processor 356, and the controller/processor 359. In one configuration, the apparatus 1402 may be a modem chip and include just the baseband processor 1404, and in another configuration, the apparatus 1402 may be the entire UE (e.g., see 350 of FIG. 3) and include the additional modules of the apparatus 1402.

Communication manager 1432 includes a storage component 1440 that is configured to store, by a modem, a URSP, the URSP associating each of a plurality of DNN identifiers and a corresponding slice, e.g., as described in connection with 1302 in FIG. 13. The communication manager 1432 further includes a PDU session component 1442 that is configured to establish a first PDU session with the first DNN and the first slice in response to receiving a first indication to start a first network interface associated with the first DNN ID and to establish a second PDU session with the first DNN and the second slice in response to receiving a second indication to start a second network interface associated with the second DNN ID, e.g., as described in connection with 1304 and 1320 in FIG. 13. The communication manager 1432 further includes a validation component 1444 that is configured to validate the application to use the second DNN ID before establishing the second PDU session with the first DNN and the second slice, e.g., as described in connection with 1318 in FIG. 13. The communication manager 1432 includes a network request API component 1446 that is configured to send to an operating system, a network request API comprising the second DNN ID and service information, e.g., as described in connection with 1306 in FIG. 13. The communication manager 1432 includes an APN table component 1448 that is configured to add a new entry in an APN context table, e.g., as described in connection with 1310 in FIG. 13. The communication manager 1432 includes a determination component 1450 that is configured to determine, e.g., at the ML, to establish a new interface based on the second DNN ID being a new identifier without a previously established interface, e.g., as described in connection with 1312 in FIG. 13.

The communication manager 1432 includes a storage component 1440 that is configured to store, by a modem, a URSP, the URSP associating each of a plurality of DNN identifiers and a corresponding slice, e.g., as described in connection with 1302 in FIG. 13. The communication manager 1432 further includes a PDU session component 1442 that is configured to establish a first PDU session with the first DNN and the first slice in response to receiving a first indication to start a first network interface associated with the first DNN ID and to establish a second PDU session with the first DNN and the second slice in response to receiving a second indication to start a second network interface associated with the second DNN ID, e.g., as described in connection with 1304 and 1320 in FIG. 13. The communication manager 1432 further includes a validation component 1444 that is configured to validate the application to use the second DNN ID before establishing the second PDU session with the first DNN and the second slice, e.g., as described in connection with 1318 in FIG. 13. The communication manager 1432 includes a network request API component 1446 that is configured to send to an operating system, a network request API comprising the second DNN ID and service information, e.g., as described in connection with 1306 in FIG. 13. The communication manager 1432 includes an APN table component 1448 that is configured to add a new entry in an APN context table, e.g., as described in connection with 1310 in FIG. 13. The communication manager 1432 includes a determination component 1450 that is configured to determine, e.g., at the ML, to establish a new interface based on the second DNN ID being a new identifier without a previously established interface, e.g., as described in connection with 1312 in FIG. 13. apparatus 1402 may include an operating system configured to pass the network request and the service information to an RIL in response to receiving the network request at the operating system from the application, the operating system, e.g., as described in connection with 1308 in FIG. 13. The apparatus 1402 may include and ML component 1452 configured to send to the modem (e.g., 1404), the second indication to start the second network interface associated with the second DNN ID, e.g., as described in connection with 1314 in FIG. 13. The apparatus 1402 may include a modem (e.g., 1404) configured to receive the second indication to start the second network interface, e.g., as described in connection with 1316.

In one configuration, the apparatus 1402 for wireless communication includes means for storing (e.g., storage component 1440), by a modem, a URSP, the URSP associating each of a plurality of DNN identifiers and a corresponding slice, where a first DNN ID is associated with a first DNN and a first slice and a second DNN ID is associated with the first DNN and a second slice different than the first slice and means for establishing a first PDU session with the first DNN and the first slice in response to receiving a first indication to start a first network interface associated with the first DNN ID and for establishing a second PDU session with the first DNN and the second slice in response to receiving a second indication to start a second network interface associated with the second DNN ID (e.g., PDU session component 1442). The apparatus 1402 may further include means for validating the application to use the second DNN ID before establishing the second PDU session with the first DNN and the second slice (e.g., the validation component 1444). The apparatus 1402 may further include means for receiving the second indication to start the second network interface (e.g., the network interface component 1446). The apparatus 1402 may further include means for sending, from an application to an operating system, a network request API comprising the second DNN ID and service information (e.g., network request API component 1446). The apparatus 1402 may further include means for passing the network request and the service information to a radio interface layer in response to receiving the network request at the operating system from the application (e.g., network request API component 1446). The apparatus 1402 may further include means for adding a new entry in an APN context table (e.g., APN table component 1448). The apparatus 1402 may further include means for determining, at the RIL, to establish a new interface based on the second DNN ID being a new identifier without a previously established interface (e.g., determination component 1450). The apparatus 1402 may further include means for sending, from the RIL to the modem, the second indication to start the second network interface associated with the second DNN ID, wherein the second indication comprises the service information (e.g., the network interface component 1446). The means may be one or more of the components of the apparatus 1402 configured to perform the functions recited by the means. As described supra, the processing system 1414 may include the TX Processor 368, the RX Processor 356, and the controller/processor 359. As such, in one configuration, the means may be the TX Processor 368, the RX Processor 356, and the controller/processor 359 configured to perform the functions recited by the means.

The apparatus may include additional components that perform each of the blocks of the algorithm in the flowcharts of FIGS. 5, 12, and 13. As such, each block in the flowcharts of FIGS. 5, 12, and 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 15:
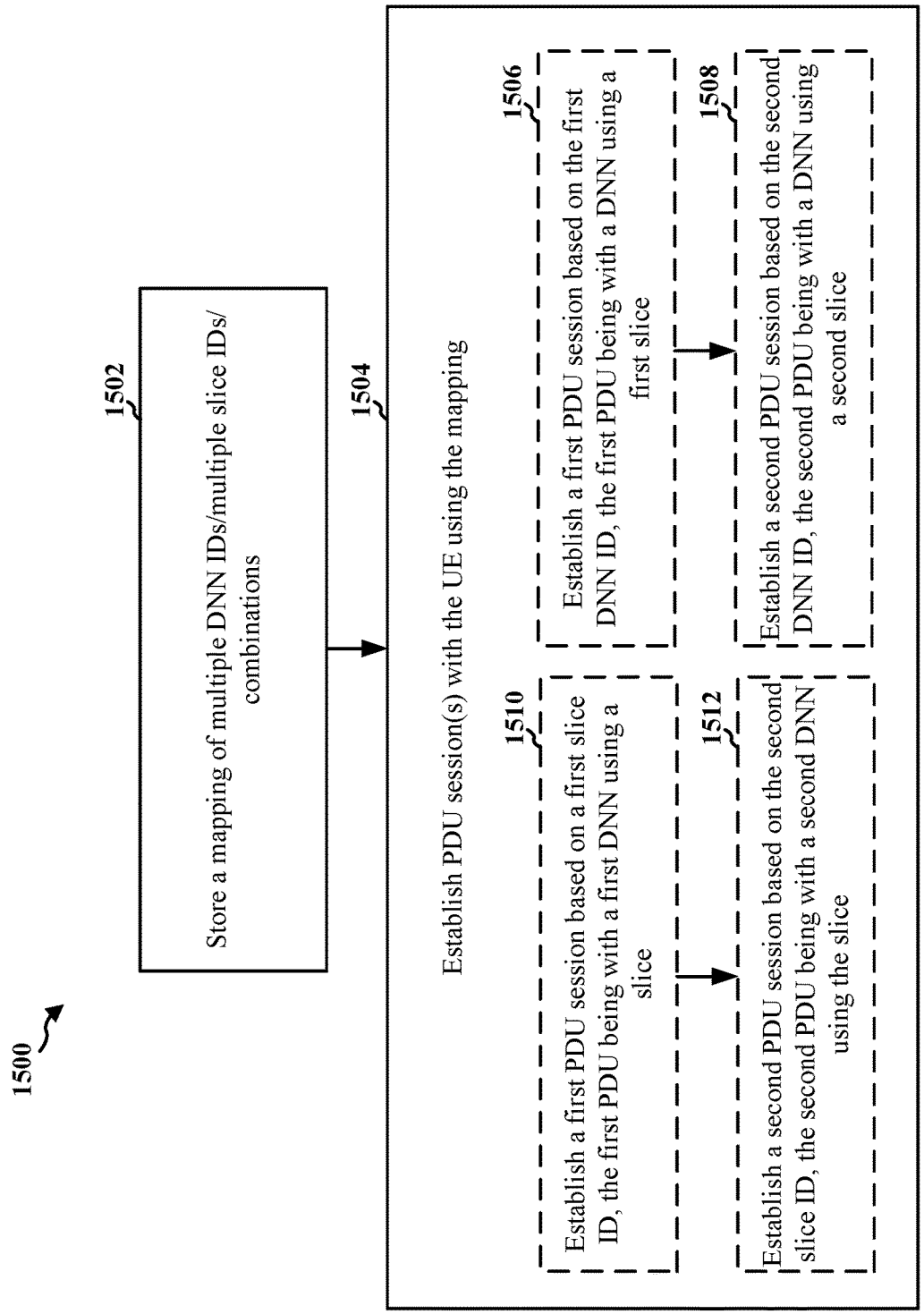
FIG. 15 is a flowchart of a method of wireless communication.

FIG. 15 is a flowchart 1500 of a method of wireless communication. The method may be performed by a network apparatus (e.g., the apparatus 1602). Optional aspects are illustrated with a dashed line.

At 1502, the network apparatus stores a mapping for at least one of multiple DNN identifiers mapped to a single DNN, multiple slice identifiers mapped to a single slice treatment, or a combination that provides different slice treatment for a single DNN. As described in connection with FIG. 12, the network 1210 may map both DNN_Internet and a DNN_Internet_xyz for the same DNN. The multiple DNN IDs may be associated with different slices for the same DNN, as described in connection with FIG. 12. The storage of the mapping may be performed by the storage component 1640 of the apparatus 1602 in FIG. 16.

At 1504, the network apparatus establishes one or more PDU sessions with a UE using the mapping, e.g., such as 1207 and 1221 in FIG. 12. The establishment of the one or more PDU sessions may be performed, e.g., by the PDU session component 1644 of the apparatus 1602 in FIG. 16.

In some aspects, the network apparatus may establish, at 1506, a first PDU session with the UE based on a first DNN ID, where the first PDU session is with a DNN using a first slice (e.g., DNN_Internet using the eMBB slice). At 1508, the network apparatus establishes a second PDU session with the UE based on a second DNN identifier, where the second PDU session is with the DNN using a second slice (e.g., DNN_Internet using the URLLC slice).

In some aspects, the network apparatus may establish, at 1510, a first PDU session with the UE based on a first slice, where the first PDU session is with a first DNN using a slice. At 1512, the network apparatus may establish a second PDU session with the UE based on a second slice identifier, where the second PDU session is with a second DNN using the slice.

Figure 16:
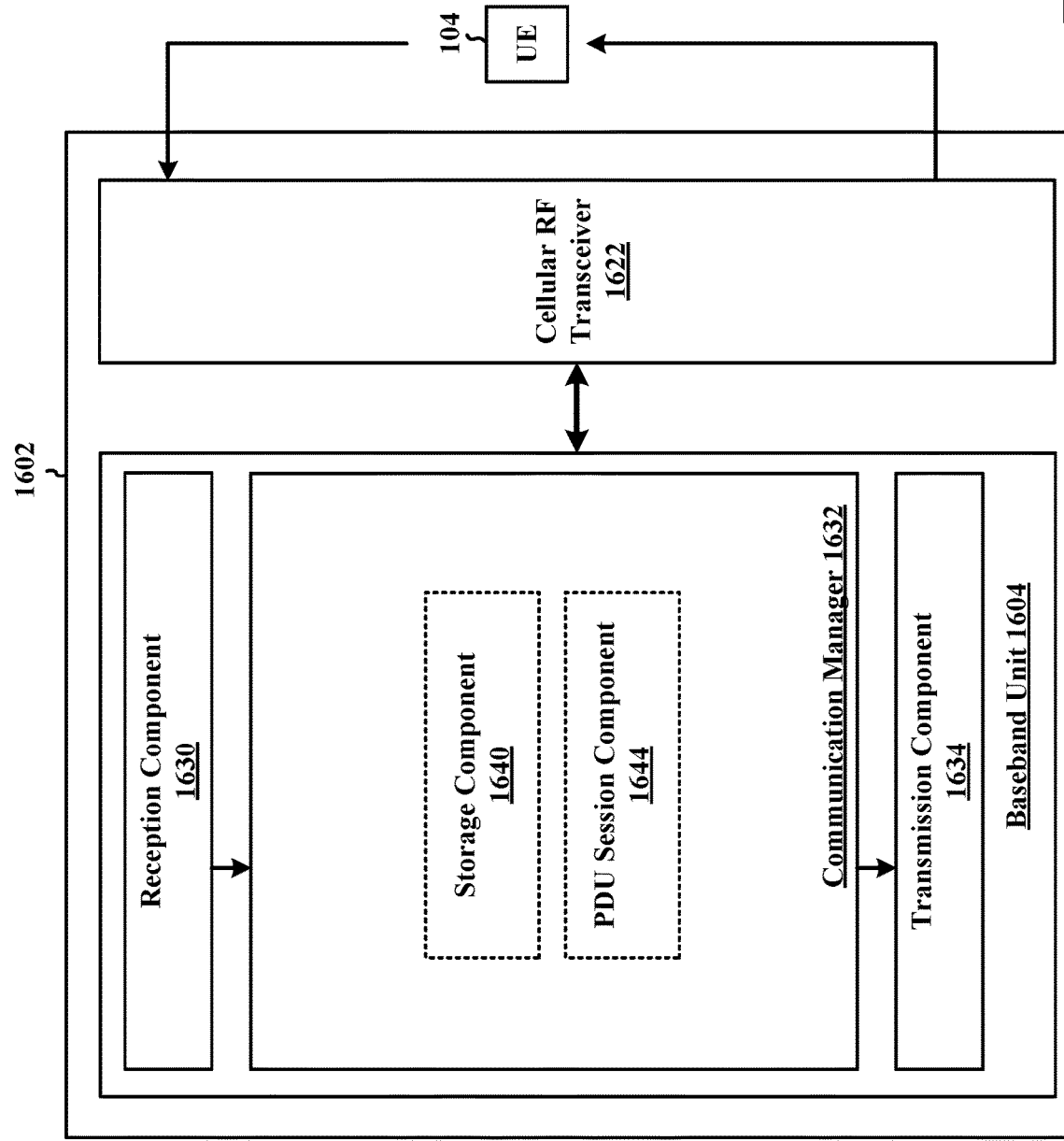
FIG. 16 is a diagram illustrating an example of a hardware implementation for an apparatus employing a processing system.

FIG. 16 is a diagram 1600 illustrating an example of a hardware implementation for an apparatus 1602. The apparatus 1602 is network component and includes a baseband unit 1604. The baseband unit 1604 may communicate through a cellular RF transceiver 1622 with the UE 104. The baseband unit 1604 may include a computer-readable medium/memory. The baseband unit 1604 is responsible for general processing, including the execution of software stored on the computer-readable medium/memory. The software, when executed by the baseband unit 1604, causes the baseband unit 1604 to perform the various functions described supra. The computer-readable medium/memory may also be used for storing data that is manipulated by the baseband unit 1604 when executing software. The baseband unit 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the baseband unit 1604. The baseband unit 1604 may include components such as the memory 376 and/or at least one of the TX processor 316, the RX processor 370, and the controller/processor 375.

The communication manager 1632 includes a storage component 1640 that is configured to store a mapping for at least one of multiple DNN identifiers mapped to a single DNN, multiple slice identifiers mapped to a single slice treatment, or a combination that provides different slice treatment for a single DNN, e.g., as described in connection with 1502 in FIG. 15. The communication manager 1632 further includes a PDU session component 1644 that is configured to establish one or more PDU sessions with a UE using the mapping, e.g., as described in connection with 1504 in FIG. 15.

The apparatus 1602 may include components that perform each of the blocks of the algorithm in the flowchart of FIG. 15, and the aspects performed by the network in FIGS. 5 and 12. As such, each block in the flowchart of FIG. 15, and the aspects performed by the network in FIGS. 5 and 12, may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1602 for wireless communication, and in particular the baseband unit 1604, includes means for storing a mapping for at least one of multiple DNN identifiers mapped to a single DNN, multiple slice identifiers mapped to a single slice treatment, or a combination that provides different slice treatment for a single DNN (e.g., the storage component 1640) or means for establishing one or more PDU sessions with a UE using the mapping (e.g., PDU session component 1644). The means may be one or more of the components of the apparatus 1602 of the apparatus 1602 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication for wireless communication at a UE, comprising: storing, by a modem, an URSP, the URSP associating each of a plurality of DNN identifiers and a corresponding slice, wherein a first DNN ID is associated with a first DNN and a first slice and a second DNN ID is associated with the first DNN and a second slice different than the first slice; establishing a first PDU session with the first DNN and the first slice in response to receiving a first indication to start a first network interface associated with the first DNN ID; and establishing a second PDU session with the first DNN and the second slice in response to receiving a second indication to start a second network interface associated with the second DNN ID.

In Aspect 2, the method of aspect 1 further includes that the second indication is initiated by an application, the method further comprising: validating the application to use the second DNN ID before establishing the second PDU session with the first DNN and the second slice.

In Aspect 3, the method of aspect 1 or aspect 2 further includes receiving the second indication to start the second network interface, wherein the second indication includes the second DNN ID and service information, wherein the modem validates the application to use the second DNN ID using the URSP and the service information.

In Aspect 4, the method of aspect 3 further includes that the service information includes one or more parameters comprising: an operating system identifier, an application identifier, remote IPv4 information, an IPv4 address mask, remote IPv6 information, an IPv6 prefix length, a remote FQDN, a destination port, a destination port range, a destination port range lower limit, a destination port range higher limit, a destination MAC address for non-internet protocol packets, a VID of a customer VLAN tag, or a VID of a service VLAN tag.

In Aspect 5, the method of aspect 3 or aspect 4 further includes that the modem validates the application to use the second DNN ID using the URSP and an application identifier comprised in the service information.

In Aspect 6, the method of any of aspects 1-5 further includes sending, from an application to an operating system, a network request API comprising the second DNN ID and service information.

In Aspect 7, the method of aspect 6 further includes, in response to receiving the network request API at the operating system from the application, passing the network request and the service information to a RIL; and adding a new entry in an APN context table.

In Aspect 8, the method of aspect 7 further includes determining, at the RIL, to establish a new interface based on the second DNN ID being a new identifier without a previously established interface; and sending, from the RIL to the modem, the second indication to start the second network interface associated with the second DNN ID, wherein the second indication comprises the service information.

In Aspect 9, the method of any of aspects 1-8 further includes that the first slice is an eMBB slice.

In Aspect 10, the method of any of aspects 1-9 further includes that the second slice is an URLLC slice, a MIoT slice, or an operator defined proprietary slice.

In Aspect 11, the method of any of aspects 1-8 further includes that the first slice is an URLLC slice and the second slice is an eMBB slice, an MIoT slice, or an operator defined proprietary slice.

In Aspect 12, the method of any of aspects 1-8 further includes that the first slice is an MIoT slice and the second slice is an eMBB slice, an URLLC slice, or an operator defined proprietary slice.

Aspect 13 is an apparatus for wireless communication at a UE, comprising means for performing the method of any of aspects 1-12.

Aspect 14 is an apparatus for wireless communication at a UE, comprising: a memory; and at least one processor coupled to the memory, wherein the memory and the at least one processor are configured to perform the method of any of aspects 1-12.

Aspect 15 is a non-transitory computer-readable storage medium storing computer executable code for wireless communication at a UE, the code when executed by a processor cause the processor to perform the method of any of aspects 1-12.

Aspect 16 is a method of wireless communication at a network, comprising: storing a mapping for at least one of: multiple DNN identifiers mapped to a single DNN, multiple slice identifiers mapped to a single slice treatment, or a combination that provides different slice treatment for the single DNN; and establishing one or more PDU sessions with a UE using the mapping.

In Aspect 17, the method of aspect 16 further includes establishing a first PDU session with the UE based on a first DNN ID, wherein the first PDU session is with a DNN using a first slice; and establishing a second PDU session with the UE based on a second DNN identifier, wherein the second PDU session is with the DNN using a second slice.

In Aspect 18, the method of aspect 16 further includes establishing a first PDU session with the UE based on a first slice ID, wherein the first PDU session is with a first DNN using a slice; and establishing a second PDU session with the UE based on a second slice identifier, wherein the second PDU session is with a second DNN using the slice.

Aspect 19 is an apparatus for wireless communication at a network, comprising: means for performing the method of any of aspects 16-18.

Aspect 20 is an apparatus for wireless communication at a network, comprising: a memory; and the memory and the at least one processor coupled to the memory, wherein the memory and the at least one processor are configured to perform the method of any of aspects 16-18.

Aspect 21 is a computer-readable storage medium storing computer executable code for wireless communication at a network, the code when executed by a processor cause the processor to perform the method of any of aspects 16-18.

What is claimed is:

1. A method of wireless communication at a user equipment (UE), comprising:
storing, by a modem, a UE route selection policy (URSP), the URSP associating each of a plurality of data network name (DNN) identifiers and a corresponding slice, wherein a first DNN identifier (ID) is associated with a first DNN and a first slice and a second DNN ID is associated with the first DNN and a second slice different than the first slice;
establishing a first protocol data unit (PDU) session with the first DNN and the first slice in response to receiving a first indication to start a first network interface associated with the first DNN ID;
validating an application to use the second DNN ID; and
establishing a second PDU session with the first DNN and the second slice, after validating the application to use the second DNN ID, in response to receiving a second indication initiated by the application and indicating to start a second network interface associated with the second DNN ID.

2. The method of claim 1, further comprising:
receiving the second indication to start the second network interface, wherein the second indication includes the second DNN ID and service information, wherein the modem validates the application to use the second DNN ID using the URSP and the service information.

3. The method of claim 2, wherein the service information includes one or more parameters comprising:
an operating system identifier,
an application identifier,
remote Internet Protocol version 4 (IPv4) information,
an IPv4 address mask,
remote internet protocol version 6 (IPv6) information,
an IPv6 prefix length,
a remote fully qualified domain name (FQDN),
a destination port,
a destination port range,
a destination port range lower limit,
a destination port range higher limit,
a destination medium access control (MAC) address for non-internet protocol packets,
a virtual local area network identifier (VID) of a customer virtual local area network (VLAN) tag, or
a VID of a service VLAN tag.

4. The method of claim 2, wherein the modem validates the application to use the second DNN ID using the URSP and an application identifier comprised in the service information.

5. The method of claim 1, wherein the first slice is an enhanced Mobile Broadband (eMBB) slice.

6. The method of claim 5, wherein the second slice is an Ultra-Reliable Low Latency Communications (URLLC) slice, a massive Internet of Things (MIoT) slice, or an operator defined proprietary slice.

7. The method of claim 1, wherein the first slice is an Ultra-Reliable Low Latent Communications (URLLC) slice and the second slice is an enhanced Mobile Broadband (eMBB) slice, a massive Internet of Things (MIoT) slice, or an operator defined proprietary slice.

8. The method of claim 1, wherein the first slice is a massive Internet of Things (MIoT) slice and the second slice is an enhanced Mobile Broadband (eMBB) slice, an URLLC slice, or an operator defined proprietary slice.

9. A method of wireless communication at a user equipment (UE), comprising:
storing, by a modem, a UE route selection policy (URSP), the URSP associating each of a plurality of data network name (DNN) identifiers and a corresponding slice, wherein a first DNN identifier (ID) is associated with a first DNN and a first slice and a second DNN ID is associated with the first DNN and a second slice different than the first slice;
establishing a first protocol data unit (PDU) session with the first DNN and the first slice in response to receiving a first indication to start a first network interface associated with the first DNN ID;
sending, from an application to an operating system, a network request application programming interface (API) comprising the second DNN ID and service information; and
establishing a second PDU session with the first DNN and the second slice in response to receiving a second indication to start a second network interface associated with the second DNN ID.

10. The method of claim 9, further comprising:
in response to receiving the network request API at the operating system from the application, passing a network request and the service information to a radio interface layer (RIL); and
adding a new entry in an access point name (APN) context table.

11. The method of claim 10, further comprising:
determining, at the RIL, to establish a new interface based on the second DNN ID being a new identifier without a previously established interface; and
sending, from the RIL to the modem, the second indication to start the second network interface associated with the second DNN ID, wherein the second indication comprises the service information.

12. An apparatus for wireless communication at a user equipment (UE), comprising:
a memory; and
at least one processor coupled to the memory, wherein the memory and the at least one processor are configured to:
store, by a modem, a UE route selection policy (URSP), the URSP associating each of a plurality of data network name (DNN) identifiers and a corresponding slice, wherein a first DNN identifier (ID) is associated with a first DNN and a first slice and a second DNN ID is associated with the first DNN and a second slice different than the first slice;
establish a first protocol data unit (PDU) session with the first DNN and the first slice in response to receiving a first indication to start a first network interface associated with the first DNN ID;
validate an application to use the second DNN ID; and
establish a second PDU session with the first DNN and the second slice, after validation of the application to use the second DNN ID, in response to receiving a second indication initiated by the application and indicating to start a second network interface associated with the second DNN ID.

13. The apparatus of claim 12, wherein the memory and the at least one processor are further configured to:
receive the second indication to start the second network interface, wherein the second indication includes the second DNN ID and service information, wherein the modem is configured to validate the application to use the second DNN ID using the URSP and the service information.

14. The apparatus of claim 13, wherein the service information includes one or more parameters comprising:
    an operating system identifier,
    an application identifier,
    remote Internet Protocol version 4 (IPv4) information,
    an IPv4 address mask,
    remote internet protocol version 6 (IPv6) information,
    an IPv6 prefix length,
    a remote fully qualified domain name (FQDN),
    a destination port,
    a destination port range,
    a destination port range lower limit,
    a destination port range higher limit,
    a destination medium access control (MAC) address for non-internet protocol packets,
    a virtual local area network identifier (VID) of a customer virtual local area network (VLAN) tag, or
    a VID of a service VLAN tag.

15. The apparatus of claim 13, wherein the modem is configured to validate the application to use the second DNN ID using the URSP and an application identifier comprised in the service information.

16. The apparatus of claim 12, wherein the first slice is an enhanced Mobile Broadband (eMBB) slice.

17. The apparatus of claim 16, wherein the second slice is an Ultra-Reliable Low Latency Communications (URLLC) slice, a massive Internet of Things (MIoT) slice, or an operator defined proprietary slice.

18. The apparatus of claim 12, wherein the first slice is an Ultra-Reliable Low Latent Communications (URLLC) slice and the second slice is an enhanced Mobile Broadband (eMBB) slice, a massive Internet of Things (MIoT) slice, or an operator defined proprietary slice.

19. The apparatus of claim 12, wherein the first slice is a massive Internet of Things (MIoT) slice and the second slice is an enhanced Mobile Broadband (eMBB) slice, an URLLC slice, or an operator defined proprietary slice.

20. An apparatus for wireless communication at a user equipment (UE), comprising:
    a memory; and
    at least one processor coupled to the memory, wherein the memory and the at least one processor are configured to:
        store, by a modem, a UE route selection policy (URSP), the URSP associating each of a plurality of data network name (DNN) identifiers and a corresponding slice, wherein a first DNN identifier (ID) is associated with a first DNN and a first slice and a second DNN ID is associated with the first DNN and a second slice different than the first slice;
        establish a first protocol data unit (PDU) session with the first DNN and the first slice in response to receiving a first indication to start a first network interface associated with the first DNN ID;
        send, from an application to an operating system, a network request application programming interface (API) comprising the second DNN ID and service information; and
        establish a second PDU session with the first DNN and the second slice in response to receiving a second indication to start a second network interface associated with the second DNN ID.

21. The apparatus of claim 20, wherein the memory and the at least one processor are further configured to:
    pass a network request and the service information to a radio interface layer (RIL) in response to reception of the network request API at the operating system from the application; and
    add a new entry in an access point name (APN) context table.

22. The apparatus of claim 21, wherein the memory and the at least one processor are further configured to:
    determine, at the RIL, to establish a new interface based on the second DNN ID being a new identifier without a previously established interface; and
    send, from the RIL to the modem, the second indication to start the second network interface associated with the second DNN ID, wherein the second indication comprises the service information.

* * * * *